US011305951B2

(12) United States Patent
Harmon

(10) Patent No.: US 11,305,951 B2
(45) Date of Patent: Apr. 19, 2022

(54) COORDINATED CONTROL OF COMMODITY CONTAINER PRESSURE SELECTION WITH RUN SELECTION IN A COMMODITY DELIVERY SYSTEM OF A WORK VEHICLE

(71) Applicant: Deere & Company, Moline, IL (US)

(72) Inventor: Andrew W. Harmon, Davenport, IA (US)

(73) Assignee: Deere & Company, Moline, IL (US)

( * ) Notice: Subject to any disclaimer, the term of this patent is extended or adjusted under 35 U.S.C. 154(b) by 210 days.

(21) Appl. No.: 16/829,683

(22) Filed: Mar. 25, 2020

(65) Prior Publication Data

US 2021/0300692 A1    Sep. 30, 2021

(51) Int. Cl.
*A01C 7/08* (2006.01)
*B65G 53/56* (2006.01)
*A01C 7/20* (2006.01)

(52) U.S. Cl.
CPC .............. *B65G 53/56* (2013.01); *A01C 7/084* (2013.01); *A01C 7/206* (2013.01)

(58) Field of Classification Search
CPC ........ B65G 53/12; B65G 53/14; B65G 53/50; B65G 53/56; B65G 53/66; B60P 1/60; A01D 87/10; A01C 7/20; A01C 7/084; A01C 7/163; A01C 15/04; F16K 5/02; F16K 5/0207; F16K 5/0235; Y10T 137/87909
USPC .... 406/2, 12, 26, 28, 34, 39, 40, 41, 42, 43, 406/44, 182, 183; 111/174, 175; 137/875; 414/507, 519, 520, 539
See application file for complete search history.

(56) References Cited

U.S. PATENT DOCUMENTS

| 1,217,938 | A |   | 3/1917 | Guice |   |
|---|---|---|---|---|---|
| 2,400,703 | A | * | 5/1946 | Smith | ............ A01M 9/003 |
|   |   |   |   |   | 406/182 |
| 3,515,315 | A | * | 6/1970 | Watson | ............ A01C 7/123 |
|   |   |   |   |   | 406/182 |
| 4,007,842 | A |   | 2/1977 | Hough |   |
| 4,138,161 | A |   | 2/1979 | Payne |   |
| 4,522,291 | A |   | 6/1985 | Smick |   |

(Continued)

FOREIGN PATENT DOCUMENTS

| EP | 1164827 B1 | 1/2003 |
|---|---|---|
| WO | 2013105021 A1 | 7/2013 |

OTHER PUBLICATIONS

European Search Report issued in related application No. 19180348. 5, dated Aug. 12, 2019 (8 pages).

*Primary Examiner* — Joseph A Dillon, Jr.
(74) *Attorney, Agent, or Firm* — Tucker Ellis LLP

(57) ABSTRACT

A work vehicle includes a commodity delivery system that distributes commodity from a commodity source between a plurality of delivery runs, a commodity container pressure delivery system that may deliver selected pressure to the commodity container, and an electric control system coordinating operation of the commodity container pressure delivery system with a commodity manifold valve member delivering the commodity into a selected delivery run helping to match or otherwise balance pressure within the container storing the commodity with the selected commodity delivery path for control of siphoning and/or floating of the commodity as it is dispersed from the commodity container and into selected ones of the plurality of delivery runs of the work vehicle.

20 Claims, 15 Drawing Sheets

(56) References Cited

U.S. PATENT DOCUMENTS

| | | |
|---|---|---|
| 4,528,919 A | 7/1985 | Harbolt |
| 4,564,318 A | 1/1986 | Alexandrov |
| 5,741,094 A | 4/1998 | Heep |
| 5,845,818 A | 12/1998 | Gregor et al. |
| 6,074,136 A | 6/2000 | Steele |
| 6,120,211 A | 9/2000 | Raike |
| 6,213,690 B1 | 4/2001 | Gregor et al. |
| 6,247,877 B1 | 6/2001 | Rost |
| 6,345,645 B1 | 2/2002 | Kenna |
| 6,494,151 B1 | 12/2002 | Wark |
| 6,811,358 B2 | 11/2004 | Bauver |
| 6,857,861 B2 | 2/2005 | Condon |
| 8,001,994 B2 | 8/2011 | Miller |
| 8,641,329 B2 | 2/2014 | Barrios |
| D735,769 S * | 8/2015 | Thompson .............. D15/28 |
| 9,686,907 B2 | 6/2017 | Hui |
| 10,302,203 B2 | 5/2019 | You |
| 10,694,660 B2 * | 6/2020 | Harmon .............. A01C 7/081 |
| 11,140,811 B2 * | 10/2021 | Harmon .............. A01C 21/002 |
| 2003/0024579 A1 | 2/2003 | Blackmore |
| 2003/0131895 A1 | 7/2003 | Mitomo |
| 2005/0211802 A1 | 9/2005 | Newton |
| 2005/0236051 A1 | 10/2005 | McBeth |
| 2007/0079882 A1 | 4/2007 | Muller |
| 2010/0032033 A1 | 2/2010 | Okabe |
| 2010/0065140 A1 | 3/2010 | Joynson |
| 2010/0275759 A1 | 11/2010 | Hsiao |
| 2011/0170962 A1 | 7/2011 | Watson |
| 2012/0174844 A1 | 7/2012 | Friggstad |
| 2012/0211508 A1 | 8/2012 | Barsi et al. |
| 2012/0318390 A1 | 12/2012 | Yi |
| 2013/0008543 A1 | 1/2013 | Kaminsky et al. |
| 2014/0311598 A1 | 10/2014 | Hui |
| 2015/0345648 A1 | 12/2015 | Henke |
| 2017/0086353 A1 | 3/2017 | Borkgren et al. |
| 2017/0246642 A1 | 8/2017 | Bianca |
| 2017/0320422 A1 | 11/2017 | Roberge |
| 2019/0152723 A1 | 5/2019 | Bent et al. |
| 2021/0345539 A1 * | 11/2021 | Harmon .............. A01C 7/127 |

* cited by examiner

COORDINATED CONTROL OF COMMODITY CONTAINER PRESSURE SELECTION WITH RUN SELECTION IN A COMMODITY DELIVERY SYSTEM OF A WORK VEHICLE

CROSS-REFERENCE TO RELATED APPLICATION(S)

This application relates to U.S. application Ser. No. 16/013,679, filed Jun. 20, 2018 entitled COMMODITY DELIVERY SYSTEM FOR WORK VEHICLE WITH ROTARY MANIFOLD REGULATOR, the contents of which are incorporated by reference.

FIELD OF THE DISCLOSURE

This disclosure relates to work vehicles and implements and, more specifically, to a control system coordinating operations of a commodity delivery run selection system with a commodity container pressure selection system for matching or otherwise controlling a balancing between the pressure in a container holding a commodity with a pressure in the commodity delivery path to minimize or otherwise prevent siphoning and/or floating of the commodity for commodity delivery control as it is dispersed from a work vehicle.

BACKGROUND

Seeding work vehicles, such as air carts/seeders and other seeding devices, are configured for applying seed, fertilizer, and/or other particulate commodities to a field. The work vehicle may be operatively connected with tilling equipment for applying the commodity under the surface of the soil.

Seeding work vehicles typically include one or more containers and a metering system that meters out a predetermined quantity of the commodity from the container as the work vehicle moves across the field. These vehicles often also include a delivery system for delivering the commodity to one or more row units for delivery to the soil.

It may be desirable to include a delivery system that includes a plurality of different delivery runs, wherein each delivery run provides a different delivery path for the commodity from the container. The delivery system may have a variety of selectable configurations wherein the commodity may be commuted along different delivery paths using a pneumatic conveyance system providing a source of pressurized air for entraining the commodity in a fluidized flow within the selected path or run for delivering the commodity to the one or more row units for delivery in turn to the soil. A relatively high pressure may be used in order to provide high rates of product delivery. Because of this, the system is typically sealed off to atmospheric pressure (e.g., to maintain needed air pressure within the runs).

In order to best meter the commodity, it is desirable for the container pressure and the pressure at the commodity metering device and/or in the delivery run system to be the same or a close match. Otherwise, siphoning which increases the product delivery rate, or floating which decreases the product delivery rate, can occur. One system for balancing the container pressure with the pressure at the commodity metering device provides a mechanical selector valve that may be manually moved into a position selected by an operator for porting the commodity container to the pressure delivered to the intended delivery run. However, this mechanical selector valve is independent of the commodity control mechanism provided for the operator to use to select a commodity path for porting the commodity container to the intended delivery run. This system therefore requires significant manual operator intervention and attention, and is prone to improper and/or incomplete delivery run selection. This may result in a potentially large mismatch between the container pressure and the pressure at the commodity metering device, in turn delivering undesired product flow rate downstream to the delivery system and openers.

Another system provides a mechanical plate valve that may be manually moved along a linear path into a position selected by an operator in concert with a corresponding linear movement of a similar plate valve for the commodity path selection for porting the commodity container to the intended delivery run. However, this system also requires significant manual operator intervention and attention, and is prone to inadvertent operation of the commodity delivery system since the commodity tank and container pressure plate valves are not directly visible to the operator. Also, occasional clogging in the system by the commodity may result in a false sensation by the operator of full and complete mechanical end travel of the plate valves. This may result during operation in a potentially large mismatch between the container pressure and the pressure at the commodity metering device, and also in turn delivering undesired product flow rate to the row units.

SUMMARY

This disclosure provides improved systems and methods for automatically operably coupling and coordinating operation of a container pressure delivery system of a work vehicle with a commodity delivery system of the work vehicle. This disclosure also provides improved systems and methods operably coupling and automatically coordinating operation of a container pressure delivery system with operation of a commodity delivery system.

In one aspect, the disclosure provides a work vehicle that includes a container storing an associated commodity, a commodity delivery system operatively coupled with the container, a container pressure delivery system for delivering the commodity from the container, and a control system operable to couple the container pressure delivery system with the commodity delivery system. The commodity delivery system is configured to receive the associated commodity from the container and to distribute the associated commodity between a plurality of delivery runs. For this the commodity delivery system has a manifold that includes first and second run structures and a manifold, wherein the first run structure defines a first run passage configured to receive an associated first fluid flowing from an associated first source at a first pressure, and the second run structure defines a second run passage configured to receive an associated second fluid flowing from an associated second source at a second pressure. The manifold regulator defines a manifold regulator body and a manifold valve member that is movable between first and second positions relative to the manifold regulator body. When selectively in the position relative to the manifold regulator body the manifold valve member distributes the associated commodity into the associated first fluid flowing in the first run structure of the plurality of delivery runs. Conversely, the manifold valve member selectively in the second position relative to the manifold regulator body distributes the associated commodity into the associated second fluid flowing in the second run structure of the plurality of delivery runs. The container pressure delivery system is operable to selectively fluid couple the container storing the associated commodity with the associated first fluid at the first pressure, or with the associated second fluid at the second pressure. The control system may be an electric control system in an example embodiment that is responsive to an associated selection signal to coordinate operation of the commodity manifold valve member selectively in the first position relative to the manifold body with the container pressure delivery system selectively fluid coupling the container with the associated first fluid at the first pressure to pressurize the container to the first pressure. The electric control system is further responsive to the associated selection signal to coordinate operation of the commodity valve member selectively in the second position relative to commodity manifold body with the container pressure delivery system selectively fluid coupling the container with the associated second fluid at the second pressure to pressurize the container to the second pressure.

In an aspect, a container pressure regulator may be provided for regulating the pressure delivered to the commodity container. The container pressure regulator may include a container pressure delivery system body and a container pressure delivery system valve member that is selectively movable between first and second positions relative to the container pressure delivery system body. The container pressure delivery system valve member in the first position relative to the container pressure delivery system body may couple the container with the associated first fluid at the first pressure to pressurize the container to the first pressure. Similarly, the container pressure delivery system valve member in the second position relative to the body may couple the container with the associated second fluid at the second pressure to pressurize the container to the second pressure. In addition, the container pressure delivery system valve member when disposed in positions near to but not fully at the first position relative to the container pressure delivery system body may partially couple the container with the associated first fluid at the first pressure to partially pressurize the container to a selected reduced proportion of the first pressure owing to partial or incomplete respective alignment of openings provided in the system body and valve members. In further addition, the container pressure delivery system valve member when disposed in positions near to but not fully at the second position relative to the container pressure delivery system body may partially couple the container with the associated second fluid at the second pressure to partially pressurize the container to a selected reduced proportion of the second pressure owing to partial or incomplete respective alignment of openings provided in the system body and valve members. In still further addition, the container pressure delivery system valve member when disposed in selected positions not fully at either of the first and/or second positions relative to the container pressure delivery system body may: i) partially restrict a first flow of the associated first fluid at the first pressure delivered to the container, and completely restricts a second flow of the associated second fluid at the second pressure to block the second flow of the associated second fluid from flowing to the container, or) ii partially restrict the second flow of the associated second fluid at the second pressure delivered to the container, and completely restricts the first flow of the associated first fluid at the first pressure to block the first flow of the associated second fluid from flowing to the container.

In accordance with a further aspect, the container pressure delivery system valve member of the container pressure delivery system may be coupled with the manifold valve member of the commodity delivery system by a mechanical connection, an electrical connection, and/or a combination of both mechanical and electrical connections. A common or shared linkage system may be provided mechanically coupling the container pressure delivery system valve member of the container pressure delivery system with the manifold valve member of the commodity delivery system. At least one system motor is operable to drive the linkage system to effect relative movement between the container pressure delivery system valve member and the container pressure delivery system body, and between the manifold valve member and the manifold body. Also, one or more linkage systems and one or more electric motors may be provided, each of the one or more linkage systems being operated by the one or more electric motors or the like.

In accordance with yet a further aspect, a manifold regulator position sensor operably coupled with the manifold regulator of the commodity delivery system is provided. The manifold regulator position sensor may selectively generate a first signal responsive to the manifold valve member being in the first position relative to the manifold body and, similarly, the manifold regulator position sensor may selectively generate a second signal responsive to the manifold valve member being in the second position relative to the manifold body. A container pressure delivery system motor operable to effect relative movement between the container pressure delivery system valve member and the container pressure delivery system body is provided. The container pressure delivery system motor is operable to selectively move the container pressure delivery system valve member to the first position relative to the container pressure delivery system body responsive to the first signal from the manifold regulator position sensor for coupling the container with the associated first fluid at the first pressure. The container pressure delivery system motor is further selectively operable to move the container pressure delivery system valve member to the second position relative to the container pressure delivery system body responsive to the second signal from the manifold regulator position sensor for coupling the container with the associated second fluid at the first pressure.

In accordance with still a further aspect, a command control signal generator is provided. The command control signal generator may selectively generate first or second command control signals responsive to a selection input signal. Manifold and container pressure delivery system motors are further provided, wherein the manifold motor is operable to effect relative movement between the manifold valve member and the manifold body, and the container pressure delivery system motor is operable to effect relative movement between the container pressure delivery system valve member and the container pressure delivery system body. The manifold motor may selectively move the manifold valve member to the first position relative to the manifold body responsive to the first command control signal from the command control signal generator for distributing the associated commodity into the associated first fluid flowing in the first run structure of the plurality of delivery runs. The manifold motor may selectively move the manifold valve member to the second position relative to the manifold body responsive to the second command control signal from the command control signal generator for distributing the associated commodity into the associated second fluid flowing in the second run structure of the plurality of delivery runs. The container pressure delivery system motor may selectively move the container pressure delivery system valve member to the first position relative to the container pressure delivery system body responsive to the first command control signal from the command control signal generator for coupling the container with the associated first fluid at the first pressure. The container pressure delivery system motor may further selectively move the container pressure delivery system valve member to the second position relative to the container pressure delivery system body responsive to the second command control signal from the command control signal generator for coupling the container with the associated second fluid at the second pressure.

In accordance with yet a still further aspect, a flow controlling device may be provided in the container pressure delivery system for selectively tuning a first flow of the associated first fluid at the first pressure to be delivered to the container, and/or for selectively tuning a second flow of the associated second fluid at the second pressure to be delivered to the container.

In accordance with yet a still further aspect, a flow restricting device may be provided in the container pressure delivery system for selectively restricting a first flow of the associated first fluid at the first pressure delivered to the container, and/or for selectively restricting a second flow of the associated second fluid at the second pressure delivered to the container.

In accordance with another aspect, the container pressure delivery system may include an integral flow regulator for selectively restricting the first or second flows of the associated first or second fluid to be delivered to the container. The container pressure delivery system may include a container pressure delivery system body and a container pressure delivery system valve member that is selectively movable between first and second positions relative to the container pressure delivery system body. When disposed in the first position relative to the container pressure delivery system body the container pressure delivery system valve member couples the container with the associated first fluid at the first pressure to pressurize the container to the first pressure, and when disposed in the second position relative to the container pressure delivery system body the container pressure delivery system valve member couples the container with the associated first fluid at the first pressure to pressurize the container to the first pressure. The container pressure delivery system valve member may also be disposed between the first and second positions relative to the body for selectively restricting the first flow of the associated first fluid at the first pressure delivered to the container, or the second flow of the associated second fluid at the second pressure delivered to the container.

In accordance with a further aspect, the container pressure delivery system may include a container pressure regulator including a container pressure delivery system body, and a container pressure delivery system valve member that is selectively rotatable between first and second positions relative to the container pressure delivery system body.

In one aspect, the container pressure delivery system valve member is selectively rotatable between first and second positions relative to the container pressure delivery system body of the container pressure delivery system for communicating the associated first or second fluids, respectively, to the commodity container.

In a further aspect, the container pressure delivery system valve member is selectively pivotable between first and second positions relative to the container pressure delivery system body of the container pressure delivery system for communicating the associated first or second fluids, respectively, to the commodity container.

In one aspect, the container pressure delivery system valve member is selectively translatable between first and second positions relative to the container pressure delivery system body of the container pressure delivery system for communicating the associated first or second fluids, respectively, to the commodity container.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
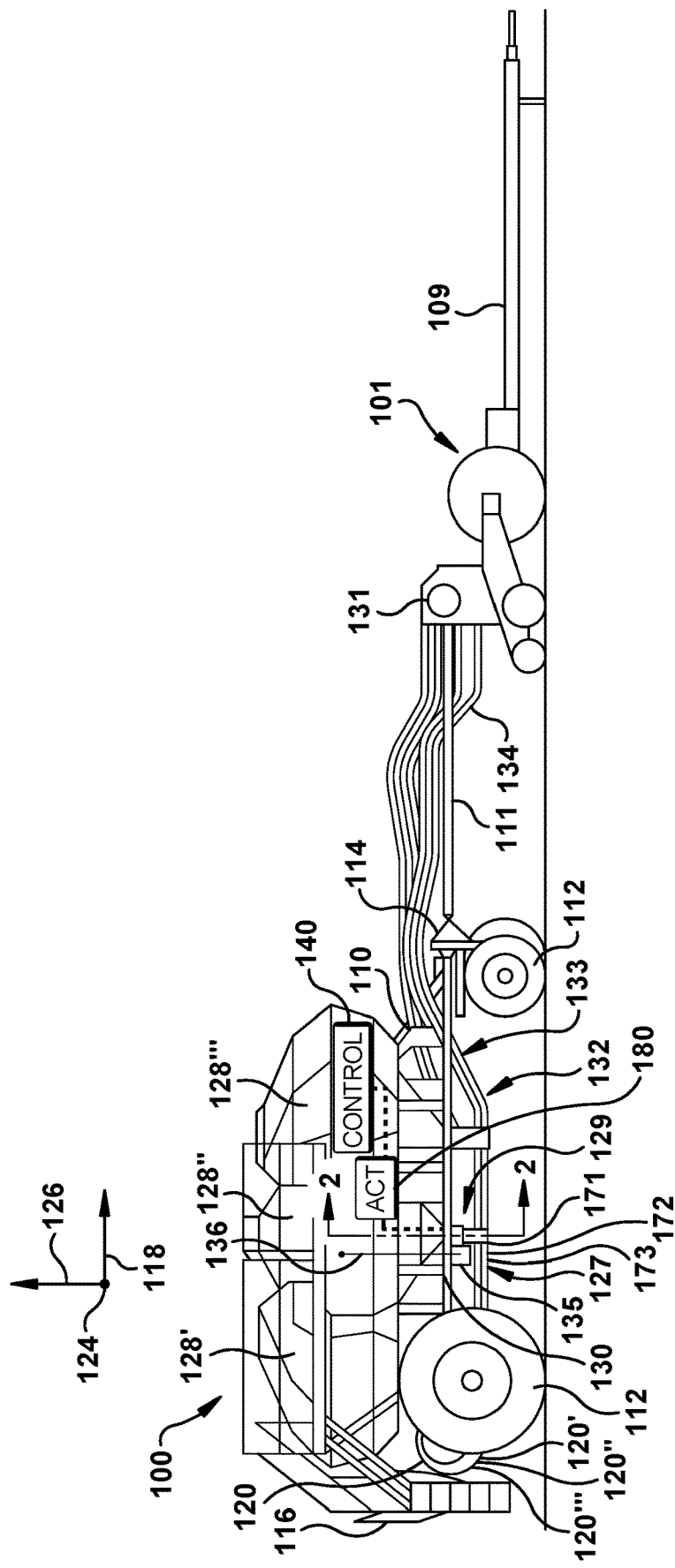
FIG. 1 is a side view of a work vehicle according to example embodiments of the present disclosure.

The following describes one or more example embodiments of an electric control system for a work vehicle (e.g., an air cart, commodity cart, etc.), coordinating operations of a commodity delivery run selection system with a commodity container pressure selection system for matching or otherwise balancing commodity container pressure with the commodity delivery path, and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of a control system for a work vehicle distributing a commodity from a tank (e.g., an air cart, commodity cart, etc.), coordinating operations of a commodity delivery run selection system for delivering a commodity away from the vehicle (e.g., to a plurality of row units that deliver the commodity to the soil) with a commodity container pressure selection system for delivering and matching or otherwise balancing pressure within a commodity container with the pressure in a commodity delivery path as shown in the accompanying figures of the drawings described briefly above. The delivery system may be configured for example to receive a commodity from the commodity source and selectively distribute the commodity between a plurality of runs. The individual runs may define separate and individual pathways for the commodity to travel from the work vehicle toward a downstream component and/or to the soil. The container pressure delivery system may be configured to, or may be operable to, selectively fluid couple the container storing the associated commodity with the associated first fluid at the first pressure when the commodity is being delivered from the work vehicle by the first fluid at the first pressure, or with the associated second fluid at the second pressure when the commodity is being delivered from the work vehicle by the second fluid at the second pressure. The control system may be an electric control system that is configured to or may be operable to, responsive to an associated selection signal, coordinate operation of the commodity manifold valve member selectively in the first position relative to the manifold body with the container pressure delivery system selectively fluid coupling the container with the associated first fluid at the first pressure to pressurize the container to the first pressure. The electric control system may be further responsive to the associated selection signal to coordinate operation of the valve member selectively in the second position relative to the body with the container pressure delivery system selectively fluid coupling the container with the associated second fluid at the second pressure to pressurize the container to the second pressure.

More specifically, the work vehicle may include a commodity delivery system with a plurality of run structures, and a container pressure delivery system for coupling the commodity container to a source of pressure and/or air flow from one or more selected ones of the plurality of run structures. The run structures may comprise tubes, pipes, lines, or other elongate conduits. The run structures may be attached to downstream components (e.g., downstream distribution manifolds, row units, etc.). The commodity delivery system may include at least one manifold regulator (i.e., selector, valve, etc.) that may move between different positions such that commodity is routed toward a selected one of the run structures, and the container pressure delivery system may include at least one container pressure regulator that may regulate or otherwise control the pressure within the commodity container to match the pressure in the selected one of the run structures. In one position of the manifold and container pressure regulators, the commodity may be routed from a source container to a first one of the run structures, and the pressure of the run structure is routed to the source container for balancing the commodity container pressure with the first one of the run structures. In another position, the commodity may be routed from the source container to another one of the run structures, and the pressure of the another run structure is routed to the source container for balancing the commodity container pressure with the another one of the run structures.

In some embodiments, the commodity manifold and/or the container pressure regulators may be supported for rotation about an axis. Rotation of the manifold regulator may change the selected pathway for the commodity through the delivery system, and rotation of the container pressure regulator may change source of pressure to be delivered to the container to be the pathway selected for delivery of the commodity through the delivery system.

In some embodiments, the commodity manifold and/or the container pressure regulators may be supported for pivotal movement about an axis. Pivoting of the manifold regulator may change the selected pathway for the commodity through the delivery system, and pivoting of the container pressure regulator may change source of pressure to be delivered to the container to be the pathway selected for delivery of the commodity through the delivery system.

In some embodiments, the commodity manifold and/or the container pressure regulators may be supported for translational motion along a pathway. Translation of the manifold regulator may change the selected pathway for the commodity through the delivery system, and translation of the container pressure regulator may change source of pressure to be delivered to the container to be the pathway selected for delivery of the commodity through the delivery system.

In some embodiments, the commodity manifold pressure regulator may be supported for rotation about an axis, pivotal movement about an axis, or translational motion along a pathway. In some embodiments, the container pressure regulator may be supported for rotation about an axis, pivotal movement about an axis, or translational motion along a pathway. Rotation, pivotal movement, or translational motion of the commodity manifold regulator may change the selected pathway for the commodity through the delivery system. Rotation, pivotal movement, or translational motion of the container pressure regulator may change source of pressure to be delivered to the container to be sourced from the pathway selected for delivery of the commodity through the delivery system.

In some embodiments, the work vehicle delivery system may include at least two runs and a commodity manifold regulator arranged in a commodity manifold. The commodity manifold regulator may be operably connected with a first run and a second run and may be selectively moved to change the downstream pathway through the commodity manifold from the first run to the second run. In additional embodiments, the commodity manifold regulator may be operably connected with a first run, a second run, and at least one additional run. It will be appreciated, thus, that the manifold regulator may be operably connected with any number of runs of a delivery system without departing from the scope of the present disclosure.

In some embodiments, the container pressure delivery system includes a container pressure delivery system body and a container pressure delivery system valve member that is selectively rotatable between first and second positions relative to the container pressure delivery system body. Rotating the container pressure delivery system valve member relative to the container pressure delivery system body may change a fluid connection between the commodity container and the first and second runs for pressurizing the commodity container to match or balance against the pressure in the selected commodity run.

In some embodiments, the container pressure delivery system includes a container pressure delivery system body and a container pressure delivery system valve member that is selectively pivotally moveable between first and second positions relative to the container pressure delivery system body. Pivoting the container pressure delivery system valve member relative to the container pressure delivery system body may change a fluid connection between the commodity container and the first and second runs for pressurizing the commodity container to match or balance against the pressure in the selected commodity run.

In some embodiments, the container pressure delivery system includes a container pressure delivery system body and a container pressure delivery system valve member that is selectively translatable between first and second positions relative to the container pressure delivery system body. Translation of the container pressure delivery system valve member relative to the container pressure delivery system body may change a fluid connection between the commodity container and the first and second runs for pressurizing the commodity container to match or balance against the pressure in the selected commodity run.

The delivery system may also be arranged into a plurality of commodity manifolds. The commodity manifolds may respectively include a manifold regulator for selecting the pathway for the commodity therethrough. In some embodiments, the container pressure delivery system valve member and the manifold regulators may be operatively attached for being simultaneously actuated by a motor of the electric control system. Similarly, in some embodiments, the container pressure delivery system valve member may be actuated by a motor of the electric control system in response to a position feedback signal received by the electric control system representative of a relative position of the commodity manifold regulators. Similarly, in some embodiments, the container pressure delivery system valve member may be actuated by a first motor of the electric control system while the commodity manifold regulators may be actuated by a second motor of the electric control system. Also, automatic actuators and/or a control system may be included for automatically actuating, position sensing, and/or other operations of the delivery system.

The delivery system may also be arranged in a compact manner. For example, one or more portions of the run structures may be arranged substantially parallel to each other. Also, the run structures may be arranged in rows that are offset horizontally and/or vertically. As such, the run structures may be arranged in a compact manner. The commodity manifold regulators may be attached to the respective run structures in a compact manner as well (e.g., with the axis of rotation of the regulator being substantially perpendicular to the axes of the run structures).

Accordingly, the delivery system may selectively distribute the commodity along a large number of potential pathways towards the row units by coordinating the source of commodity container pressure with the desired commodity pathway. Even so, the commodity and pressure delivery systems may be arranged in a compact and well-organized manner. Also, the overall part count may remain relatively low. Additionally, sealing of the components (e.g., air sealing around the manifold regulator and commodity container) may be achieved effectively with relatively few parts.

FIG. 1 illustrates a work vehicle 100 according to example embodiments of the present disclosure. In the illustrated embodiment, the work vehicle 100 may be towed by another vehicle, such as a tractor (not shown). In other embodiments, the work vehicle 100 of the present disclosure may be a self-propelled vehicle. In some embodiments, the work vehicle 100 may be an air cart or air drill that contains a bulk amount of a commodity, that meters out the commodity from the bulk amount, and that moves the metered commodity away from the work vehicle 100 for planting in the ground. In some embodiments, the commodity delivered from the work vehicle 100 may be metered further downstream before being planted.

The work vehicle 100 shown in FIG. 1 is merely an example embodiment of the present disclosure. One or more features of the present disclosure may be included on a different work vehicle, such as a planter, a commodity cart, or other work vehicle without departing from the scope of the present disclosure.

A longitudinal axis 118 (i.e., primary axis) is indicated in FIG. 1 for reference purposes. The longitudinal axis 118 may be substantially parallel to a direction of travel of the work vehicle 100. Thus, the longitudinal axis 118 may be parallel to a fore-aft axis of the work vehicle 100. A lateral axis 124 is also indicated in FIG. 1. The lateral axis 124 may be perpendicular to the longitudinal axis 118 and may extend between opposite lateral sides of the work vehicle 100. Furthermore, a vertical axis 126 is indicated in FIG. 1 for reference purposes.

The work vehicle 100 may be configured for delivering the commodity to one or more row units 101. Each row unit 101 may include features for respectively tilling the soil, opening a furrow in the soil, depositing the commodity into the furrow, and closing the furrow. In some embodiments, the row units 101 may be connected together and arranged in series along the lateral axis 124. Thus, although only one row unit 101 is shown in FIG. 1, it will be appreciated that similar row units 101 may be included and disposed in series along the lateral axis 124. The row units 101 may be connected with the work vehicle 100 via a rear tow bar 111. The row units 101 may also be connected with the towing vehicle (e.g., tractor) via a forward tow bar 109. Accordingly, the row units 101 may be disposed between the work vehicle 100 and the towing vehicle with respect to the longitudinal axis 118. However, the row units 101 may be disposed behind the work vehicle 100 in some embodiments and/or the row units 101 may be directly connected with the work vehicle 100 (i.e., directly connected with the frame of the work vehicle 100) without departing from the scope of the present disclosure.

As shown in FIG. 1, the work vehicle 100 may include a frame 110 (i.e., chassis) and a plurality of wheels 112. The frame 110 may be assembled from rigid beams, bars, brackets, or other structures and may support the components described in detail below. The wheels 112 may support the frame 110 on terrain and enable movement of the vehicle 100 across the terrain. As shown, the frame 110 may extend between a front end 114 and a rear end 116 of the work vehicle 100. The tow bar 111 may extend from the frame 110 at the front end 114 for attaching the work vehicle 100 to the row units 101.

The work vehicle 100 may further include one or more commodity containers 128 (tanks, vessels, or other commodity source). The containers 128 may be supported on the frame 110. The commodity containers 128 may contain seed, fertilizer, and/or another particulate or granular commodity. Additionally, in some embodiments, the containers 128 may include a liquid commodity. There may be any number of containers 128. In the illustrated embodiment, for example, there are four commodity containers 128, one of which is hidden from view, and three (3) of which 128', 128", 128"' are not hidden from view.

Additionally, the work vehicle 100 may include at least one metering system 130. The metering system 130 may be a volumetric metering system. The metering system 130 may be configured to receive commodity from the commodity container 128 and may meter commodity to a downstream component. In some embodiments, the metering system 130 may be supported by the frame 110 and may be disposed generally underneath the commodity container(s) 128. The work vehicle 100 may include a plurality of metering elements (e.g., metering rollers) that actuate to meter out the commodity from the commodity container 128. During operation, particles of the commodity within one of the containers 128 may move vertically downward toward the metering system 130. The metering system 130 may operate to meter out the commodity from the container 128 at a controlled rate as the vehicle 100 moves across the field.

The work vehicle 100 may also include a delivery system 132. The delivery system 132 may include at least one delivery run 133. The delivery run(s) 133 may define a fluid pathway for delivery of the commodity away from the work vehicle 100. In some embodiments, a plurality of the runs 133 may include a respective run structure 127 (i.e., a primary tube or pipe) that is supported below the metering system 130. The run structures 127 may be rigid pipe segments that are fixed to the frame 110. The run structures 127 may be in fluid communication with downstream components (e.g., downstream pipe segments in the respective run 133, downstream manifolds, and/or the row units 101).

The runs 133 may conduct a flow of air from the rear end 116 to the front end 114 and away from the work vehicle 100. Airflow within the runs 133 may be generated by one or more fan(s) or other source(s) 120 mounted on the rear end 116 of the vehicle 100. The one or more fan(s) or other source(s) 120 provide one or more source(s) of flowing fluid(s) at one or more different pressure(s) as may be necessary and/or desired to carry the one or more different commodities to the row units 101. In some embodiments, a first run structure 171 defines a first run passage configured to receive an associated first fluid flowing from an associated first source 120' at a first pressure, a second run structure 172 defines a second run passage configured to receive an associated second fluid flowing from an associated second source 120" at a second pressure, and a third run structure 173 defines a third run passage configured to receive an associated third fluid flowing from an associated third source 120"' at a third pressure.

Additionally, the runs 133 may be operably connected with the metering system 130 such that particles of the commodity metered out by the metering system 130 may be received by selected ones of the runs 133. In some embodiments, the particles may move substantially vertically downward into the selected runs 133. Once in the runs 133, the air stream therein may propel the metered particles away from the work vehicle 100 and toward the row units 101.

In some embodiments, at least one of the runs 133 of the delivery system 132 may be operably connected with a downstream metering system 131. As shown in FIG. 1, the downstream metering system 131 may be supported by the row unit 101. It will be appreciated that a plurality of row units 101 may include respective downstream metering systems 131. Additionally, in some embodiments, some row units 101 may include a respective downstream metering system 131 and others may not. In some embodiments, the downstream metering system 131 may be a singulating metering system that receives commodity via one of the runs 133 and that meters out singulated particles of the commodity therefrom for planting.

Furthermore, the delivery system 132 may include at least one manifold regulator 129 system. The manifold regulator 129 system may be supported by the frame 110 in some embodiments. The manifold regulator 129 system may be operably disposed between the metering system 130 and two or more of the run structures 127, and between the pressure sources 120, 120', 12" and the commodity tanks 128, 128', 128". As will be discussed, the manifold regulator 129 system may be configured for selectively changing the pathway for the commodity from a first container through a selected one of the delivery runs 133 by movement of a valve member relative to a body member of a commodity valve, and simultaneously also for automatically delivering pressure to the first container supplying the commodity in accordance with the selected delivery run pathway selected. For example, the manifold regulator 129 system may be manually or automatically moved to select a first position of the valve member relative to the body in which commodity metered from the metering system 130 is payed out from a first commodity container to a first one of the runs 133 for delivery to a respective row unit 101. The manifold regulator system 129 may further be manually or automatically moved to select a second position of the valve member relative to the body in which commodity metered from the metering system 130 is payed out from the first commodity container to a second one of the runs 133 for delivery to a different row unit 101. The manifold regulator system 129 further may still further be manually or automatically moved to select a third position of the valve member relative to the body in which commodity metered from the metering system 130 is payed out from the first commodity container to a third one of the runs 133 for delivery to a further different row unit 101. The position of the manifold regulator system 129 in the first position may also be used to control a further valve member relative to a further body member of a container pressure selection manifold to supply pressure to the first commodity container from the first one of the runs 133 to help balance the pressure within the container when the commodity is being delivered using the first one of the runs 133. The manifold regulator system 129 in the second position may also be used to control the further valve member relative to the further body member to supply pressure to the first commodity container from the second one of the runs 133 to help balance the pressure within the first container when the commodity is being delivered using the second one of the runs 133. Similarly, the position of the manifold regulator system 129 in the third position may also be used to control the further valve member relative to the further body member to supply pressure to the first commodity container from the third one of the runs 133 to help balance the pressure within the first container when the commodity is being delivered using the third one of the runs 133.

In some embodiments, the manifold regulator system 129 may be manually moved by an operator between the different positions for the purpose of selecting a desired commodity path with the result thereby of also controlling both the flow of the commodity to the selected delivery run as well as simultaneously controlling the pressure delivered to the container holding the commodity to match and/or otherwise closely approximate the pressure in the selected delivery run. In other embodiments, movement of the manifold regulator system 129 may be at least partly automated. For example, a user may select which of the runs 133 will be used to deliver the commodity, and an actuator 180 (FIG. 2) (e.g., an electric motor, a hydraulic actuator, a pneumatic actuator) may be included to automatically actuate the manifold regulator system 129 for simultaneously controlling the pressure delivered to the container holding the commodity to match and/or otherwise closely approximate the pressure in the selected delivery run accordingly. In still other embodiments, movement of the manifold regulator system 129 may be fully automated. For example, a user may select which of the runs 133 will be used to deliver the commodity using an operator interface 202, 203 (FIG. 2) coupled with a control system 140 (FIG. 2) including a processor 200 (FIG. 2) comprising a memory storing logic executable by the processor, and an actuator 180 (FIG. 2) (e.g., an electric motor, a hydraulic actuator, a pneumatic actuator) may be included to automatically actuate the manifold regulator system 129 according to commands received from the control system based on the input received by the control system from the operator.

The work vehicle 100 may also include a container pressure delivery system 135. The container pressure delivery system 135 may include at least one container pressure delivery run 136 for operatively fluid coupling at least one of the commodity containers 128" with a selected one of the delivery run(s) 133 of the delivery system 132. In some embodiments and as will be described in greater detail below, the container pressure delivery system 135 includes a container pressure manifold 158 including a container pressure regulator 145 (FIG. 2) having a container pressure delivery system body 146 and a container pressure delivery system valve member 361 (FIGS. 3-6) that is disposed within the container pressure delivery system body 146. In the example embodiments, the container pressure delivery system valve member 361 is selectively movable between various positions relative to the container pressure delivery system body 146. In some embodiments, the container pressure regulator 145 of the container pressure delivery system 135 has the same construction as the commodity regulators 161-167 (FIG. 2) of the commodity delivery system 132. In some embodiments, the container pressure valve member 361 may be disposed in a first position relative to the container pressure delivery system body 146 to couple the commodity container 128" with the associated first fluid source 120' at the first pressure to pressurize the container 128" to the first pressure such as may be desired when delivering the commodity from the container 128" via the first run passage 174 of the first run structure 171 (FIG. 3). The container pressure delivery system valve member 361 may further be disposed in a second position relative to the container pressure delivery system body 146 to couple the commodity container 128" with the associated second fluid source 120" at the second pressure to pressurize the container 128" to the second pressure such as may be desired when delivering the commodity from the container 128" via the second run passage 175 of the second run structure 172 (FIG. 3). The container pressure delivery system valve member 361 may further yet be disposed in a third position relative to the container pressure delivery system body 146 to couple the commodity container 128" with the associated third fluid source 120''' at the third pressure to pressurize the container 128" to the third pressure such as may be desired for example when delivering the commodity from the container 128" via the third run passage 176 of the third run structure 173 (FIG. 3). This helps to match or otherwise balance the commodity container pressure with the selected commodity delivery path for control of siphoning and/or floating of the commodity as it is dispersed from a work vehicle.

The container pressure delivery system valve member 361 may be used in an example embodiment to block the commodity container 128" form the associated fluid sources 120', 120", 120''' when the valve member 361 is moved to one of the positions between the first, second, and third positions relative to the container pressure delivery system body 146.

In some embodiments, the container pressure delivery system 135 includes, in addition to the container pressure regulator 145 (FIG. 2), a flow regulator system 900 (FIG. 9) for helping to match or otherwise balance the pressure of the selected commodity container with the selected commodity delivery path for control of siphoning and/or floating of the commodity as it is dispersed from a work vehicle. In one example, the flow regulator system 900 is a flow regulator device 902 selectively regulating a first flow of the associated first fluid at the first pressure delivered to the container 128", or a second flow of the associated second fluid at the second pressure delivered to the container 128". In another example, the flow regulator system is provided integral with the container pressure regulator 145 by an interaction between a channel 190 in the valve member 361 and openings in a manifold seat provided on the body 146 and corresponding branch 210 structure conformations, wherein the container pressure delivery system valve member disposed between the first and second positions relative to the body may, in the three (3) commodity delivery system 132 shown in FIGS. 1-6, selectively regulate a first flow of the associated first fluid at the first pressure delivered to the container, or a second flow of the associated second fluid at the second pressure delivered to the container, and wherein the container pressure delivery system valve member disposed between the second and third positions relative to the body may selectively regulate the second flow of the associated second fluid at the second pressure delivered to the container, or a third flow of the associated third fluid at the third pressure delivered to the container, and wherein the container pressure delivery system valve member disposed between the third and first positions relative to the body may selectively regulate the third flow of the associated third fluid at the third pressure delivered to the container, or the first flow of the associated first fluid at the first pressure delivered to the container.

Figure 2:
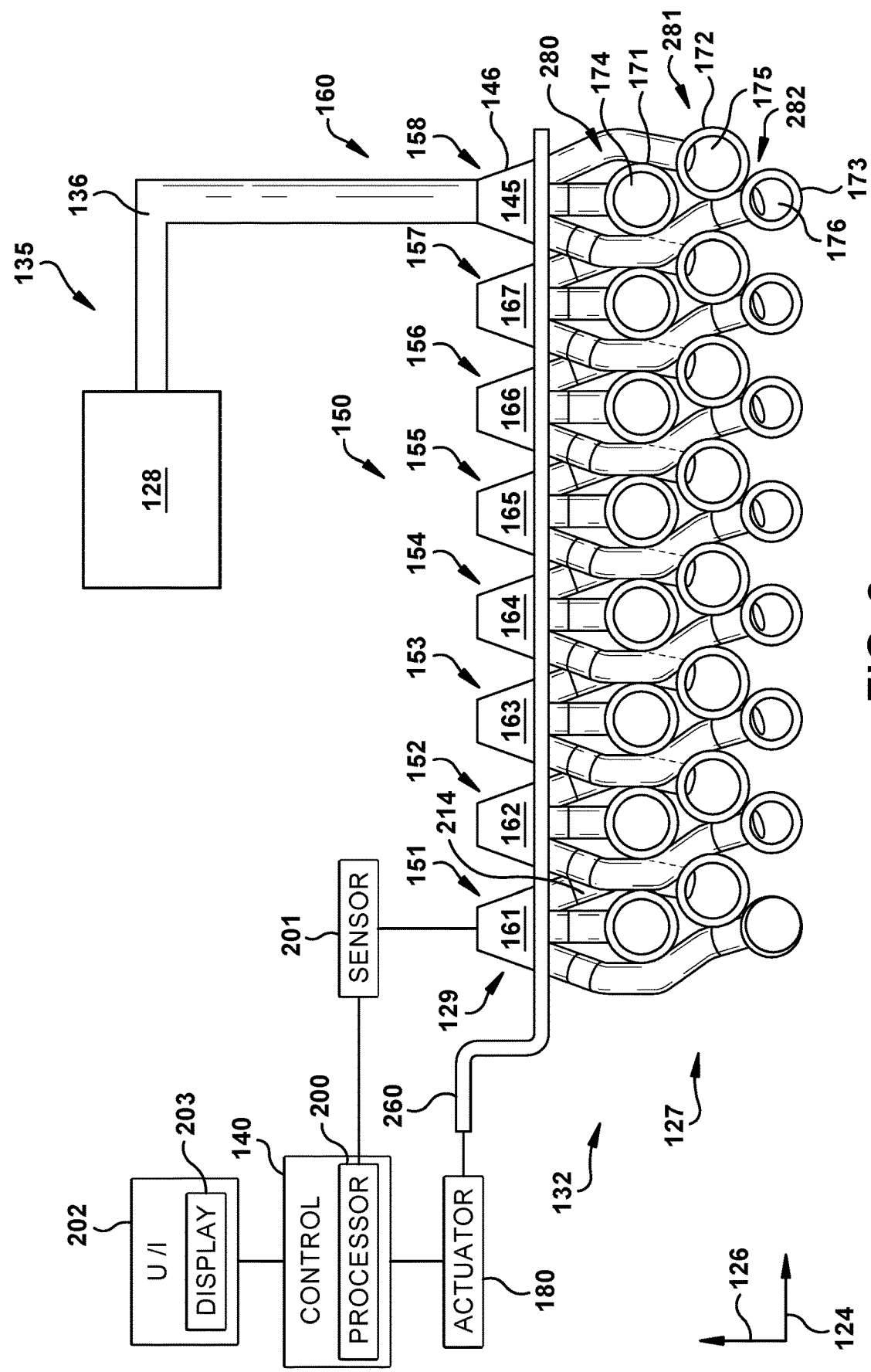
FIG. 2 is a section view of a delivery system the work vehicle taken along the line 2-2 of FIG. 1 according to example embodiments.
Figure 3:
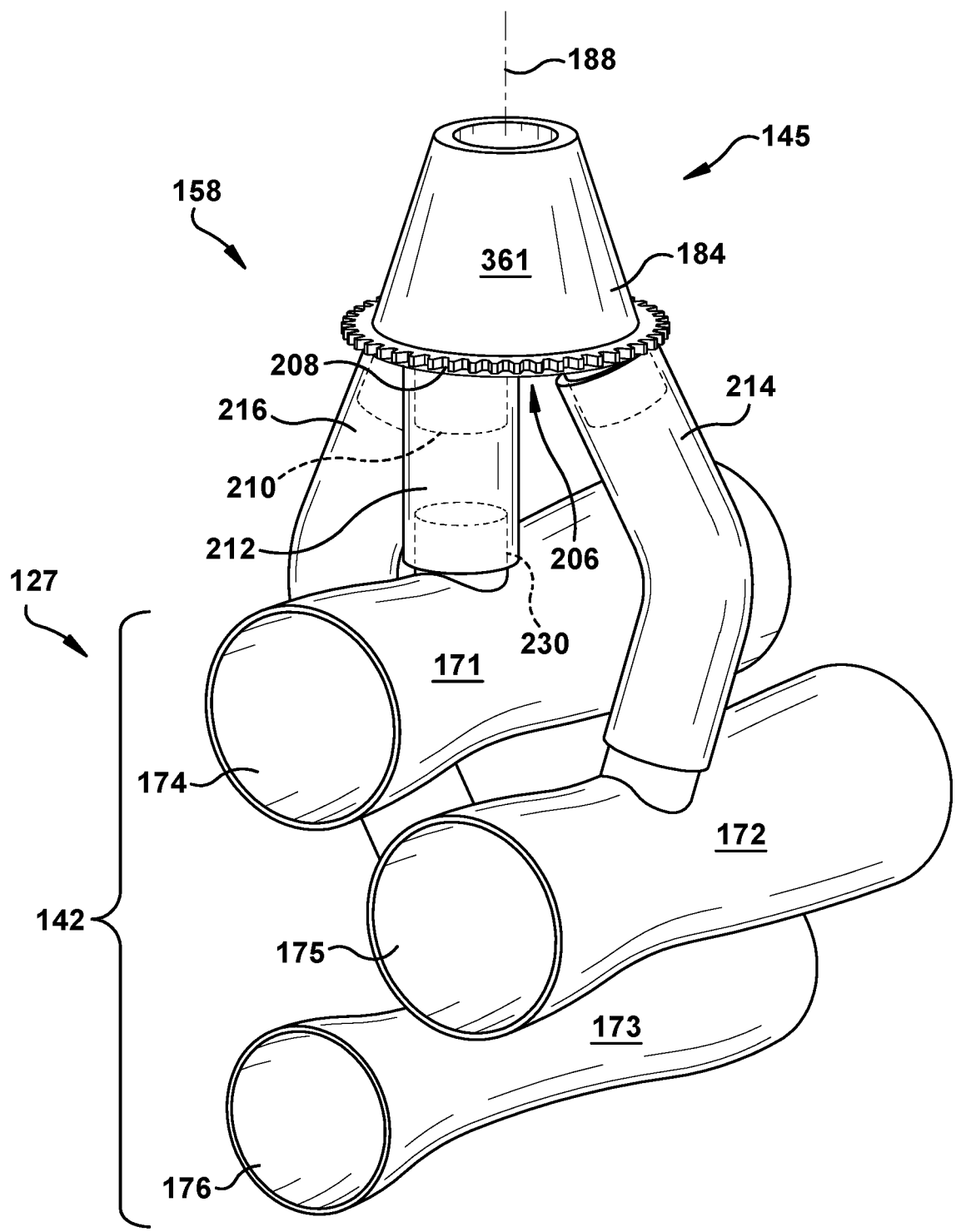
FIG. 3 is an isometric view of a container pressure regulator coupled with a commodity manifold according to example embodiments of the present disclosure.

Referring now in particular to FIG. 2, parts of the commodity delivery system 132 and the container pressure delivery system 135 are illustrated in detail and will be discussed in greater detail. It will be appreciated that certain parts of the work vehicle 100 are hidden for clarity.

An electric control system 140 may be provided on the work vehicle 100 in accordance with an embodiment. The electric control system 140 may include and/or communicate with various components of a computerized device, such as a processor 200, a data storage device within the processor storing logic executable by the processor 200, a user interface 202 having a display 203, etc. The electric control system 140 may be in communication with and may be configured for controlling the metering system 130, the commodity delivery system 132, the container pressure delivery system 135, the actuator 180, and/or other components of the work vehicle 100. The electric control system 140 may be wholly supported on the work vehicle 100, or the electric control system 140 may include components that are remote from the vehicle 100. The electric control system 140 may be in electronic, hydraulic, pneumatic, mechanical, and/or other communication with the metering system 130, the commodity delivery system 132, the actuator 180, etc.

In some embodiments, during operation of the work vehicle 100 (e.g., when towed by a tractor or other towing vehicle), the electric control system 140 may control the metering system 130 (e.g., by controlled actuation of the metering rollers), which allows a controlled quantity of particles to pass into the delivery system 132 at a predetermined rate. The manifold regulator system 129 may be disposed in a selected position (e.g., positioned manually or automatically with the actuator 180 of the electric control system 140) to direct the metered commodity to predetermined ones of the delivery runs 133 of the delivery system 132. In addition, the electric control system 140 may also control the container pressure delivery system 135 during operation of the work vehicle 100 for supplying the proper and/or desired pressure to the container to match or balance with the pressure at the metering system 130 for control of siphoning and/or floating of the commodity as it is dispersed from a work vehicle.

The commodity delivery system 132 may be arranged in a plurality of commodity plenums or manifolds 150. For example, as shown in the illustrated embodiment, there may be seven (7) commodity manifolds 151-157. Similarly, the container pressure delivery system 135 may be arranged in one or more container pressure plenums or manifolds 160. For example, as shown in the illustrated embodiment, there may be a first container pressure manifold 158. In the example embodiment, the container pressure regulator 145 is operatively coupled with the commodity container 128", by way of example, for communicating pressure from one of the sources 120', 120", 120'" via one of the delivery runs to the commodity container 128". It is to be appreciated however that the container pressure regulator 145 may equivalently be operatively coupled with any of the commodity containers 128, 128' or 128'" for communicating pressure from one of the sources 120', 120", 120'" via one of the runs to one of the commodity containers 128, 128' or 128". It is further to be appreciated that the container pressure regulator 145 of the container pressure delivery system 135 may equivalently be replicated and each of the replications may be operatively coupled with one of the commodity containers 128', 128", and 128'" for communicating pressure from one of the sources 120', 120", 120'" via selected ones of the commodity runs 171, 172, 173 to the commodity containers 128', 128", and 128'".

Figure 4:
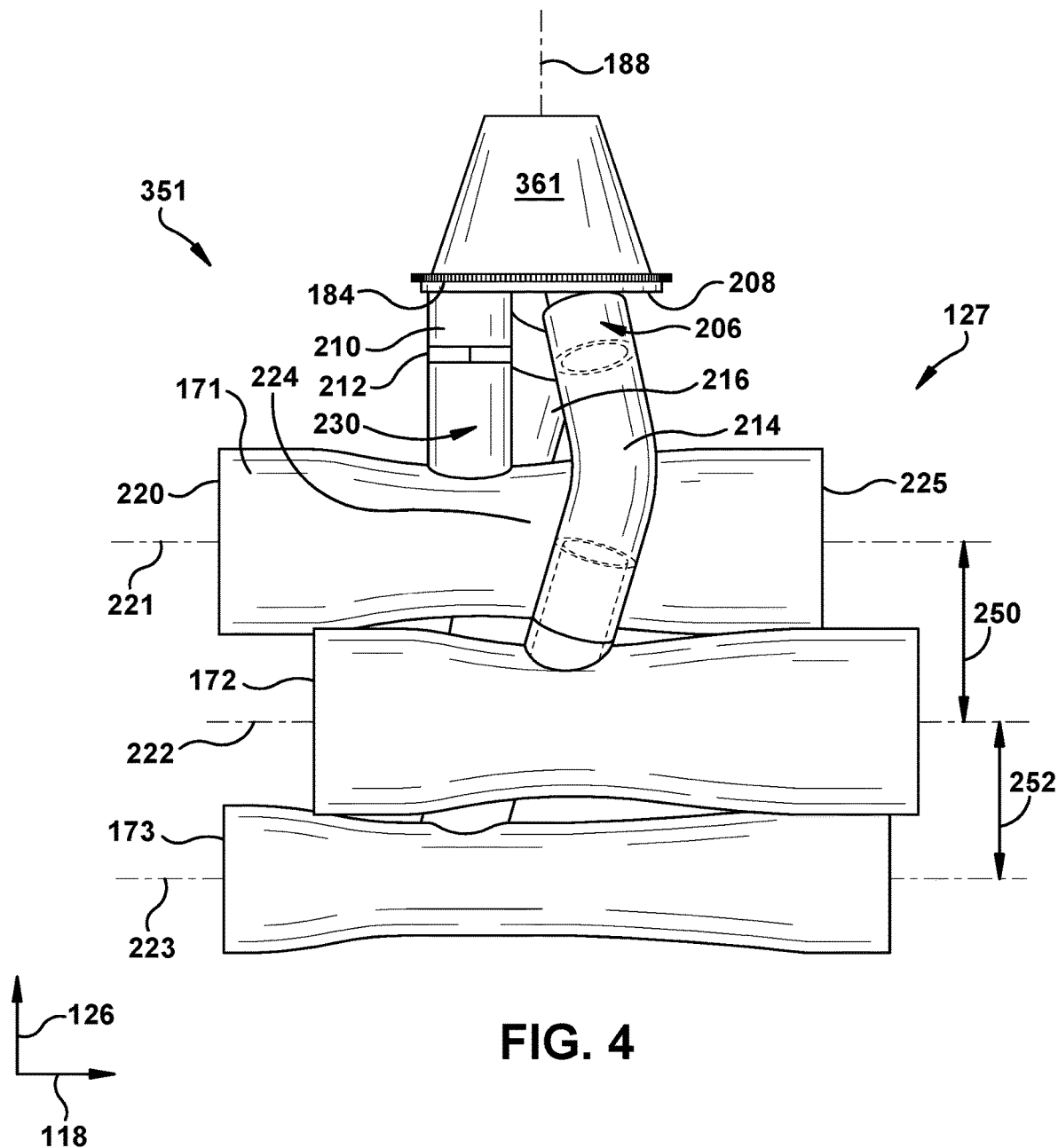
FIG. 4 is a side view of the container pressure regulator and commodity manifold of FIG. 3.

A portion of the container pressure delivery system 135 is shown independently in FIGS. 3-4 and may also be representative of portions of the commodity manifolds 151-157 of the commodity delivery system 132. The container pressure regulator 145 is coupled with a sub-set 142 of the plurality of run structures 127. The sub-set 142 may include a first run structure 171, a second run structure 172, and a third run structure 173. The first run structure 171 defines a first run passage 174. The second run structure 172 defines a second run passage 175. The third run structure 173 defines a third run passage 176. The structure of the example container pressure regulator 145 as shown may be configured for selectively distributing the first, second or third pressures from the first, second, or third run passages 174, 175, 176 back to the commodity container 128" for matching or otherwise balancing commodity container pressure with the commodity delivery path for control of siphoning and/or floating of the commodity as it is dispersed from a work vehicle. When used as a container pressure regulator it is to be understood that ends of the first, second, or third run passages 174, 175, 176 are appropriately sealed off to prevent the flow of the pressurized fluids such as air for example from escaping the system other than for being directed by the container pressure regulator 145 to a selected one of the commodity containers 128, 128', 128" or 128'".

The container pressure manifold 158 for container pressure control (as well as the other manifold commodity and container pressure regulators 129) may have a variety of shapes without departing from the scope of the present disclosure. For example, the outer profile of the container pressure manifold 158 may resemble a solid of revolution that is centered about an axis 188.

Figure 5:
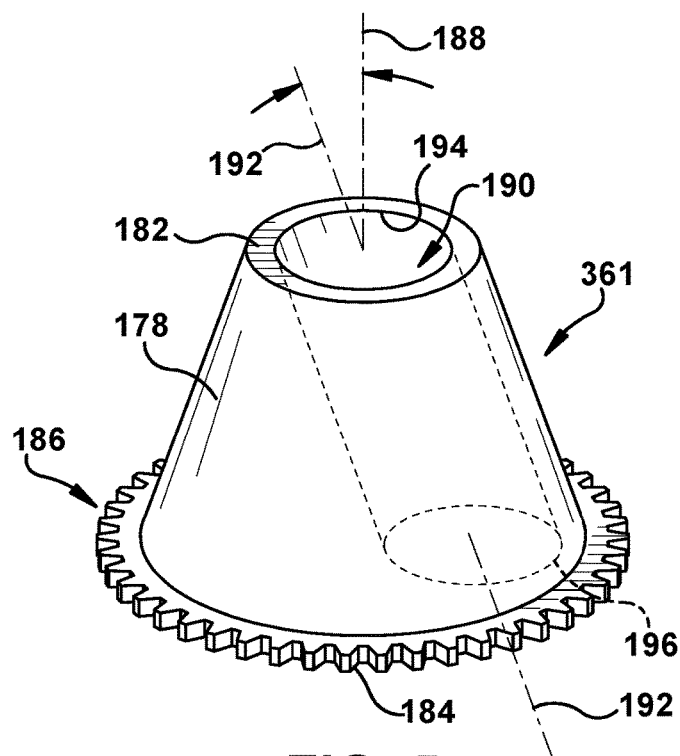
FIG. 5 is an isometric view of a manifold regulator of the commodity manifold of FIG. 3.
Figure 6:
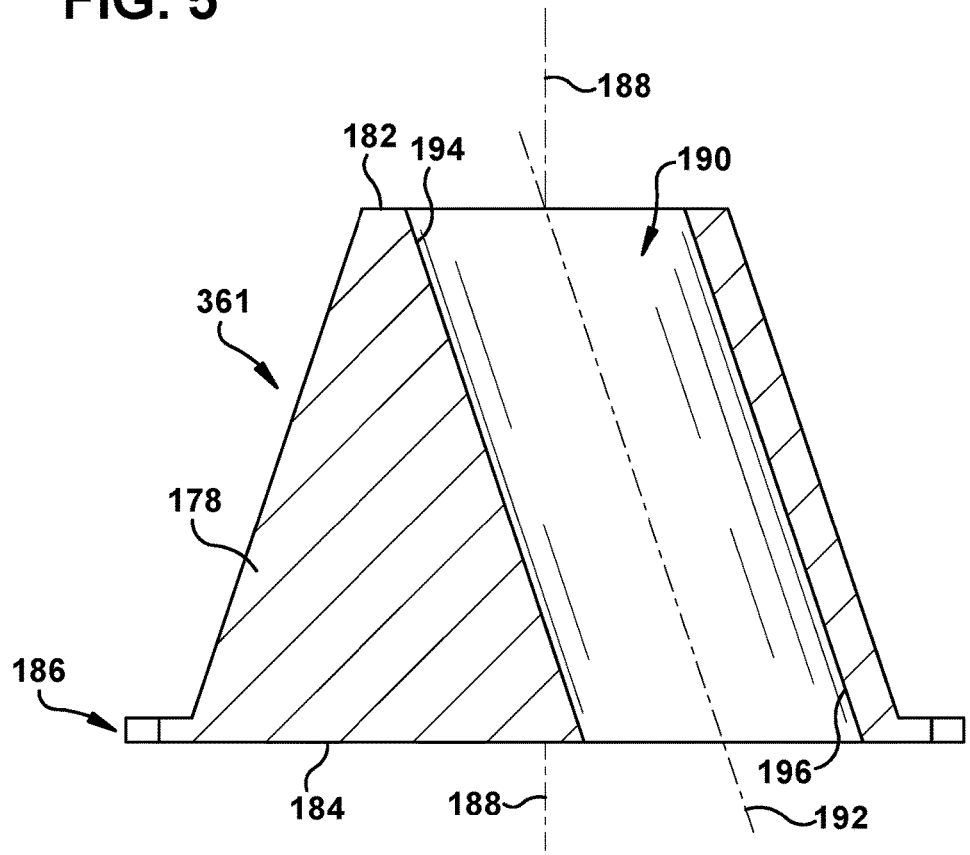
FIG. 6 is a section view of the manifold regulator of FIG. 5.

As shown in FIGS. 5 and 6 with the body 146 of the container pressure regulator 145 removed exposing the valve member 361, the valve member of an example embodiment may include a body structure 178 with a first end 182 and a second end 184. The body structure 178 may be tapered between the first end 182 and the second end 184. For example, the body structure 178 may have a frusto-conic outer profile wherein the first end 182 (the top end) is narrower than the second end 184 (the lower end). Although not shown, the body structure 178 of the valve member 361 may be housed within an outer housing such as for example the container pressure delivery system body 146 or may be otherwise surrounded and/or attached to a support structure of the work vehicle 100.

The second end 184 may include an engagement feature 186, such as gear teeth, a member of a joint, or other coupling feature. The body structure 178 may be supported for rotation about a rotation axis 188 on the work vehicle 100. In some embodiments, the rotation axis 188 may be substantially parallel to the vertical axis 126 (FIG. 1). The engagement feature 186 may be configured for driving rotation of the body structure 178 about the rotation axis 188 such as by control of an actuator 180 (e.g., an electric motor, a hydraulic actuator, a pneumatic actuator) based on one or more signals from an electric control system 140 in accordance with an example embodiment.

The body structure 178 of the body 146 of the container pressure regulator 145 may at least partly define a channel 190. The channel 190 may be a through-hole that extends continuously through the body structure 178 from the first end 182 to the second end 184 in some embodiments. In other embodiments, the body structure 178 and a surrounding housing may cooperate to define the channel 190.

The channel 190 may include a first opening 194 and a second opening 196. The first opening 194 may be defined proximate the first end 182, and the second opening 196 may be disposed proximate the second end 184.

The channel 190 may extend along a substantially straight axis 192. The axis 192 of the channel 190 may be disposed at a positive angle relative to the rotation axis 188 of the first commodity manifold 151. In some embodiments, the axis 192 and the rotation axis 188 may intersect at the first end 182 of the body structure 178.

When used as a commodity regulator, the example structure may be supported within the commodity delivery system 132 such that the first opening 194 of the channel 190 is in communication with the metering system 130 and, further upstream, with the commodity container 128". In that way, the first opening 194 may serve as an commodity inlet of the channel. As will be discussed, rotation of the body structure 178 may move the second opening 196 relative to downstream components to thereby change the path of the commodity through the delivery system 132. In that way, the second opening 194 may serve as an outlet of the channel for the commodity. When used as a container pressure regulator 145, the example structure also may be supported within the container pressure system 135 such that the first opening 194 of the channel 190 is in communication with the commodity container 128". In that way, the first opening 194 may serve as a pressure outlet of the channel. Again and as discussed, rotation of the body structure 178 of the valve member 361 of the example embodiment may move the second opening 196 relative to upstream air pressure generating components 120 to thereby change the selection of the air pressure source through the container pressure system 135. In that way, the second opening 194 may serve as an inlet of the channel 190 for the routing the air pressure from the proper and/or desired source.

As shown in FIGS. 3 and 4, the manifold device 351 may further include a manifold seat 206. The manifold seat 206 may be a unitary part made of substantially rigid material. The manifold seat 206 may include an upper disc 208 that is layered below the second end 184 of the valve member 361. The upper disc 208 may abut against and support sliding rotational movement of the second end 184 thereon. The manifold seat 206 may include a plurality (e.g., three) ports or branches 210. The branches may be hollow and cylindrical and may project downward from the upper disc 208. The branches 210 may also be spaced apart angularly about the rotation axis 188.

Moreover, the first container pressure manifold 158 of the container pressure delivery system 135 may include a plurality of conduits that are attached to respective ones of the branches 210 of the manifold seat 206. The conduits may be hollow tubes or pipes made from rigid material in some embodiments. As shown, the manifold device 351 may include a first conduit 212, a second conduit 214, and a third conduit 216, each defining a respective conduit passage therethrough. The first conduit 212, second conduit 214, and third conduit 216 may be attached to respective ones of the branches 210 of the manifold seat 206 and may extend generally vertically downward therefrom to connect to respective ones of the run structures 127. Also, in some embodiments, the passage of the first conduit 212 may extend substantially straight downward and substantially parallel to the rotation axis 188. The passage of the second and third conduits 214, 216 may be nonlinear.

As mentioned, the sub-set 142 of the run structures 127 of container pressure manifold 158 may include the first run structure 171 with the first run passage 174 that is sealed on an end otherwise open when used for commuting the commodity thereby selectively permitting pressurizing the commodity container 128" from the associated first source 120' via the first run structure based on an operation of the regulator 145. Similarly, the sub-set 142 of the run structures 127 of container pressure manifold 158 may further include the second run structure 172 with the second run passage 175 that is sealed on an end otherwise open when used for commuting the commodity thereby selectively permitting pressurizing the commodity container 128" from the associated second source 120" via the second run structure based on a further operation of the regulator 145. Also similarly, the sub-set 142 of the run structures 127 of container pressure manifold 158 may still further include the third run structure 173 with the third run passage 176 that is sealed on an end otherwise open when used for commuting the commodity thereby selectively permitting pressurizing the commodity container 128" from the associated third source 120''' via the third run structure based on yet a further operation of the regulator 361. The run structures 171, 172, 173 may differ in shape, dimension, or otherwise. For example, the inner diameter of the first and second run structures 171, 172 may be slightly larger than the inner diameter of the third run structures 173.

As shown in FIG. 4, the first run structure 171 may extend along a first run axis 221 between a first end 220 and a second end 225 of the first run structure 171. The first run structure 171 may also include an intermediate segment 224 that extends between the first and second ends 220, 225. The intermediate segment 224 may be tapered inward toward the axis 221 as compared to the first end 220 and the second end 225. The first run structure 171 may further include a hollow inlet projection 230 that projects transversely from the axis 221 and that is in fluid communication with the first run passage 174.

The lower end of the first conduit 212 may be attached to the first inlet projection 230 of the first run structure 171. Accordingly, there may be a continuous passage defined from one of the branches 210 of the manifold seat 206, through the first conduit 212, through the inlet projection 230 of the first run structure 171, and into the first run passage 174 of the first run structure 171.

The second run structure 172 may be configured similarly, except that the second conduit 214, extending from a different branch 210 of the manifold seat 206, is attached to the second run structure 172 to fluidly communicate with the second run passage 175. Also, the second run passage 175 may extend along a second run axis 222. The third conduit 216 may extend between the remaining branch 210 of the manifold seat 206 to connect to the third run structure 172 and the third run passage 176 therein. The third run passage 176 may extend along a third run axis 223.

In some embodiments, the first, second, and third run axes 221, 222, 223 may be substantially parallel to each other. Also, the first, second, and third run axes 221, 222, 223 may be substantially parallel to the longitudinal axis 118 of the work vehicle 100 in some embodiments. Furthermore, the rotation axis 188 may be substantially normal to the first, second, and third run axes 221, 222, 223.

As shown in FIG. 4, the first and second run structures 171, 172 (and their axes 221, 222) may be spaced apart at a first vertical distance 250 from each other. The second and third run structures 172, 173 may be spaced apart at a second vertical distance 252. The second run structure 172 may be disposed vertically between the first and third run structures 171, 173. Additionally, as shown in FIG. 2, the first and second run structures 171, 172 may be spaced apart at a first horizontal distance. The second and third run structures 172, 173 may also be spaced apart at a second horizontal distance. The first run structure 171 may be disposed horizontally between the second and third run structures 172, 173. The second and third conduits 214, 216 may wrap around opposite sides of the first run structure 171 and extend to the second and third run structures 172, 173, respectively.

The body structure 178 of the valve member 361 of the container pressure regulator 145 may rotate about the rotation axis 188 relative to the manifold seat 206 and move between a variety of angular positions. The first opening 194 of the channel 190 may remain in communication with the commodity container 128" as the valve member 361 moves between its various positions relative to the body 146. However, the second opening 196 may angularly move between the different branches 210 of the manifold seat 206 as the body structure 178 rotates about the axis 188.

For example, in a first position, the second opening 196 may be in communication with the passage of the first conduit 212 and the first run passage 174 of the first run structure 171. In this first position, the second opening 196 may be disconnected from the second conduit 214 and the second run structure 172 as well as the third conduit 216 and the third run structure 173. This permits pressurizing the commodity container 128" from the associated first source 120' via the first run structure 171. In some embodiments, the body structure 178 of the valve member 361 may substantially block the branches 210 of the manifold seat 206 in this first position.

In a second position of the valve member 361 of the container pressure regulator 145, the second opening 196 may be in communication with the passage of the second conduit 214 and the second run passage 175 of the second run structure 172. This permits pressurizing the commodity container 128" from the associated second source 120" via the second run structure 172. Also, the body structure 178 of the valve member 361 may disconnect the channel 190 from the first and third conduits 212, 216 and the first and third run structures 171, 173.

In a third position of the valve member 361 of the container pressure regulator 145, the second opening 196 may be in communication with the passage of the third conduit 216 and the third run passage 176 of the third run structure 173. This permits pressurizing the commodity container 128" from the associated third source 120''' via the third run structure 173. Also, the body structure 178 of the valve member 361 may disconnect the channel 190 from the first and second conduits 212, 214 and the first and second run structures 171, 172.

In some embodiments, the valve member 361 of the container pressure regulator 145 may have a shut-off position, wherein the second opening 196 of the channel 190 is disconnected from each of the three branches 210 of the manifold seat 206. In this shut-off position, the air pressure may be blocked from travelling through the channel 190 further upstream to the commodity container, respectively.

Additionally, in some embodiments, the valve member 361 of the container pressure regulator 145 may have one or more intermediate position(s), wherein the second opening 196 is only partially (not fully open to) ones of the multiple branches 210 such that the air pressure to be delivered to the commodity container 128" can be throttled or otherwise controlled for controlling pressurization of the commodity container to match or balance against the pressure in the selected commodity run when the regulator device 361 is used as the container pressure regulator 145.

As shown in FIG. 2, the manifold regulators 161-167 as well as the container pressure regulator 145 may be operably attached to a linkage 260. The linkage 260 may be an elongate bar in some embodiments. The linkage 260 may be threaded and threadably attached to the engagement feature 186 of the body structure 178 of the valve member 361 of the container pressure regulator 145. In the illustrated embodiment, the linkage 260 is engaged with the engagement feature 186 as a worm drive; however, it will be appreciated that the linkage 260 may be configured differently without departing from the scope of the present disclosure. For example, in an additional embodiment, the linkage 260 may extend parallel to the axis 188 and may include a spur gear (not shown) that meshes with the engagement feature 186. In these various embodiments, rotation of the linkage 260 about its axis may drive rotation of the manifold regulators 161-167 as well as the container pressure regulator 145 about the rotation axis 188.

In an additional embodiment the linkage 260 may include plural bar and other members for mechanically coupling with the container pressure regulator 145. As will be described in greater detail below, the linkage further may be a four bar linkage, for example, including a coupler member movable between first and second positions and first and second crank members each having opposite first and second ends. The first end of the first crank member may be attached with a valve member of one of the manifold regulators, and the second end of the first crank member may be pivotally attached with the coupler member. Similarly, the first end of the second crank may be attached with the container pressure delivery system valve member, and the second end of the second crank member may be pivotally attached with the coupler member. In that way, a non-linear movement of the coupler member may control operation of both the valve member of the manifold regulator as well as the container pressure delivery system valve member in accordance with an example embodiment.

In some embodiments, the actuator 180 (described above with respect to FIG. 1) may be operably attached with the linkage 260 for automatic rotation of the linkage 260 and of the manifold regulators 161-167 as well as the container pressure regulator 145. The actuator 180 may be operatively connected with the control system 140 and, as such, comprise an electric control system. The electric control system 140 may include a processor 200. The processor 200 may comprise hardware such as a memory, software such as logic, and/or firmware components configured to enable communications and/or interaction with the actuator 180. The control system 140 may also include a memory element (e.g., RAM memory, flash memory, EPROM memory, EEPROM memory, registers, a hard disk, a removable disk, a CD-ROM, or any other form of storage medium known in the art). In this regard, the memory element can be coupled to the processor 200 such that the processor 200 can read information from, and write information to, the memory element. In the alternative, the memory element may be integral to the processor 200. As an example, the processor 200 and the memory element may reside in an ASIC. The control system 140 may further include a user interface (U/I) with buttons, dials, displays, speakers, and/or other components which a user may manually input commands and/or receive output. Depending on the embodiment, the processor 200 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 200 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 200 includes processing logic that may be configured to carry out the functions, techniques, and processing tasks associated with the operation of the control system 140. Furthermore, the steps of a method or algorithm described in connection with the embodiments disclosed herein may be embodied directly in hardware, in firmware, in a software module executed by the processor 200, or in any practical combination thereof.

The electric control system 140 may also be in communication with one or more sensors 201. In some embodiments, the sensor 201 may be one or more position sensors configured to detect a position of one or more of the manifold regulators 161-167. The processor 200 may receive position data from the sensor 201 corresponding to the detected one or more positions, and the processor 200 may utilize this information in a variety of ways for operation of the delivery system 132, the metering system 130, the container pressure system 135, and/or other systems. In particular, the processor 200 may receive the position data from the sensor 201 corresponding to the detected one or more positions and utilize this information to control the direction of the fluid flow to the appropriate commodity container from the appropriate pressurized source for helping to match or otherwise balance the commodity container pressure with the commodity delivery path for control of siphoning and/or floating of the commodity as it is dispersed from a work vehicle.

Furthermore, the control system 140 may be in communication with a user interface 202. The user interface 202 may include various input components (e.g., control knobs, dials, buttons, etc.) with which a user may input a user command. The user interface 202 may further include one or more output components such as a display 203, an audio speaker, etc.

During operation, the processor 200 may receive one or more input signals from the user interface 202, the sensors 201, etc. For example, a user may input a user command via the user interface 202 that corresponds to a target position for the manifold regulators 129. The processor 200 may, as a result, generate and send corresponding control commands to the actuator 180. The actuator 180 may actuate to rotate the linkage 260 and ultimately drive the manifold regulators 161-167 as well as the container pressure regulator 145 toward their respective target position. In some embodiments, the sensor 201 may detect the current, actual position of the manifold regulators 161-167 and provide feedback to the processor 200 for closed-loop control of the manifold regulators 161-167 and/or of the container pressure regulator 145 to essentially "follow" the position of the manifold regulators 161-167 to control the direction of the fluid flow to the appropriate commodity container from the appropriate pressurized source for helping to match or otherwise balance the commodity container pressure with the commodity delivery path for control of siphoning and/or floating of the commodity as it is dispersed from a work vehicle. As such, the actuator 180 may continue to actuate until the detected actual position of the manifold regulators 161-167 and/or of the container pressure regulator 145 (detected by the sensor 201) substantially matches the target position input by the user. In some embodiments, the sensor 201 may also provide input to the processor 200 such that the processor 200 may provide commands to the display 203 or other component of the user interface 202 to inform the user of the current position of the manifold regulator 161 and/or other operating conditions of the delivery system 132.

In some embodiments, the container pressure regulator 145 may be decoupled from the linkage 260 and controlled by a motor separate from the actuator 180 (e.g., an electric motor, a hydraulic actuator, a pneumatic actuator), and the sensor 201 may detect the current, actual position of the manifold regulators 161-167 and provide feedback to the processor 200 for closed-loop control of the container pressure regulator 145 so that the container pressure regulator 145 may essentially "follow" the position of the manifold regulators 161-167 to control the direction of the fluid flow to the appropriate commodity container from the appropriate pressurized source for helping to match or otherwise balance the commodity container pressure with the commodity delivery path for control of siphoning and/or floating of the commodity as it is dispersed from a work vehicle. As such, the separate motor of the container pressure regulator 145 may continue to actuate in response to the detected current, actual position of the manifold regulators 161-167.

In some embodiments, the container pressure regulator 145 may be decoupled from the linkage 260 and controlled by a motor separate from the actuator 180 (e.g., an electric motor, a hydraulic actuator, a pneumatic actuator), and the electric control may selectively generating first or second command control signals responsive to a selection input signal received via the interface 202 from an operator of the system. The actuator 180 may then, responsive to the first command control signal cause operation of the manifold regulators 161-167 in accordance with the first command control signal. Similarly, the motor separate from the actuator 180 may then, responsive to the second command control signal cause operation of the container pressure regulator 145 in accordance with the second command control signal, wherein the second control signal may be based on the first control signal for the container pressure regulator 145 to essentially "follow" the position of the manifold regulators 161-167 to control the direction of the fluid flow to the appropriate commodity container from the appropriate pressurized source for helping to match or otherwise balance the commodity container pressure with the commodity delivery path for control of siphoning and/or floating of the commodity as it is dispersed from a work vehicle.

It will be appreciated that the manifold regulators 161-167 as well as the container pressure regulator 145 may be operatively connected with any number of runs 133. Although three run structures 171, 172, 173 are shown in FIGS. 3 and 4, the manifold regulators 161-167 as well as the container pressure regulator 145 may be attached to four, five, six, or more run structures and operate similar to the embodiments discussed above. In an additional embodiment of the present disclosure, the manifold regulators 161-167 as well as the container pressure regulator 145 may be operatively connected with a single run structure (e.g., for operation as a shut-off valve). In such embodiments, the seat of the regulator may be reconfigured with a single branch and a single conduit that connects the manifold regulators 161-167 as well as the container pressure regulator 145 to the sole run structure. The manifold regulators 161-167 as well as the container pressure regulator 145 may be rotated about the axis 188 between an open position and a closed position.

In the open position, the channel 190 of the manifold regulators 161-167 may fluidly connect to the conduit, allowing commodity to flow through to the sole run structure. Similarly in the open position, the channel 190 of the container pressure regulator 145 may fluidly connect to the conduit, allowing air pressure to flow to the commodity container 128" through to the sole run structure from the sole associated source 120. In the closed position, the channel 190 of the manifold regulators 161-167 as well as the container pressure regulator 145 may be fluidly disconnected, cutting off flow to the run structure.

Figure 7:
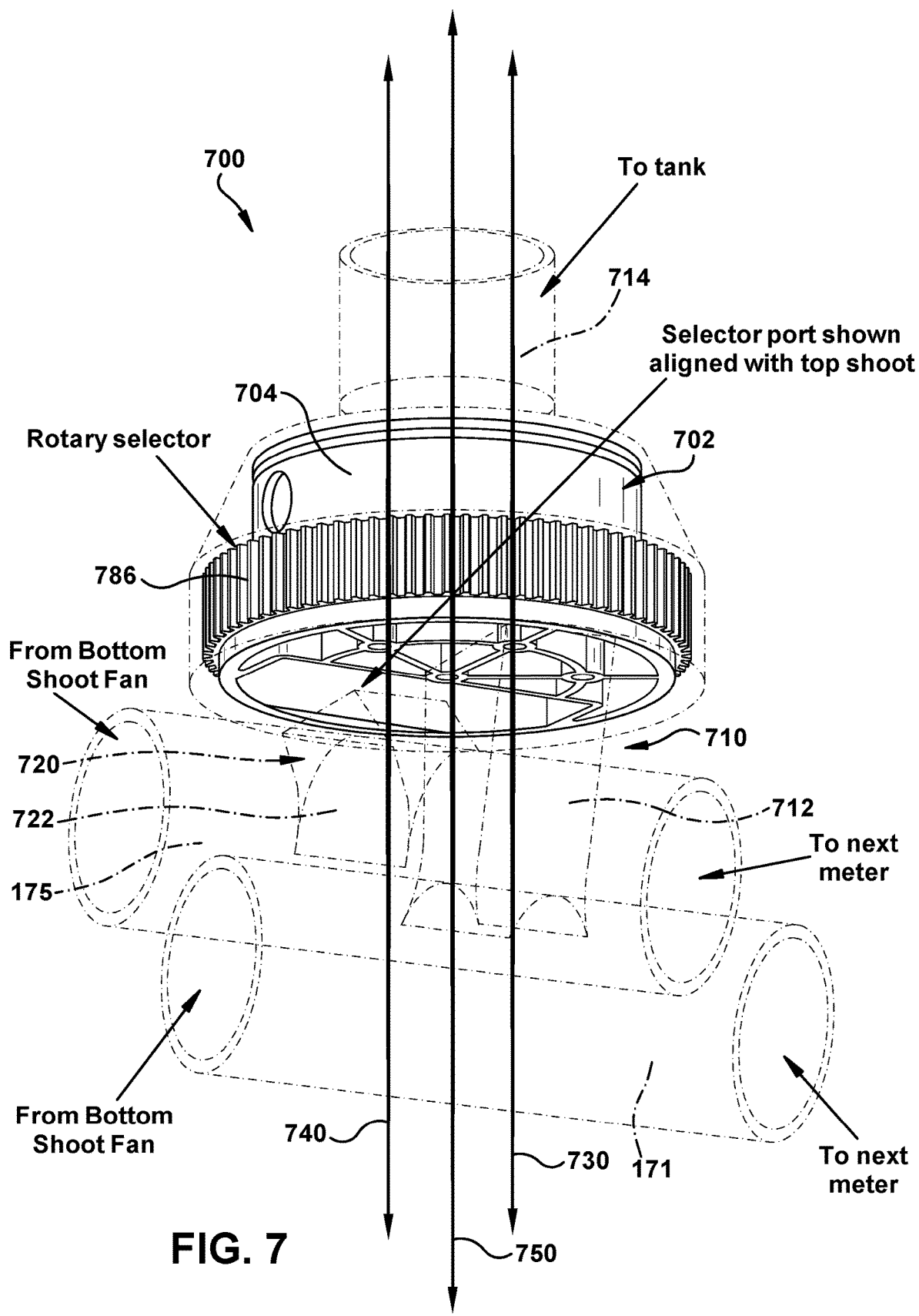
FIG. 7 is an isometric view of a commodity container pressure regulator in partial phantom according to example embodiments.

FIG. 7 shows a container pressure regulator 700 of the container pressure delivery system 135 in accordance with some embodiments. As shown there, the container pressure regulator 700 includes a container pressure delivery system body 702, and a container pressure delivery system valve member 704 that is selectively rotatable between first and second positions relative to the container pressure delivery system body 702. The container pressure delivery system valve member 704 selectively rotated to the first position relative to the container pressure delivery system body 702 of the container pressure delivery system 135 cooperatively defines with the container pressure delivery system body 702 a first channel configuration 710. The first channel configuration 710 has a first inlet 712 in operative fluid communication with the associated pressurized first fluid flowing through the first run structure 171 defining the first run passage 174 (FIG. 1) and disconnected from the associated pressurized second fluid flowing through the second run structure 172 defining the second run passage 175 (FIG. 1), and a common outlet 714 in operative fluid communication with the commodity container 128" for communicating the associated first fluid to the commodity container for pressurizing the container using the pressure of the associated pressurized first fluid. The container pressure delivery system valve member 704 selectively rotated to the second position (not shown) relative to the container pressure delivery system body 702 of the container pressure delivery system 135 cooperatively defines with the container pressure delivery system body 702 a second channel configuration 720. The second channel configuration has a second inlet 722 in operative fluid communication with the associated pressurized second fluid flowing through the second run passage 175 and disconnected from the associated pressurized first fluid flowing through the first run passage 174, and the common outlet 714 shared with the first channel configuration 710 and also in operative fluid communication with the commodity container 128" for communicating the associated second fluid to the commodity container for pressurizing the container using the pressure of the associated pressurized second fluid.

As can be seen in FIG. 7, the first channel configuration 710 extends along a first run axis 730, and the second channel configuration 720 extends along a second run axis 740. In this embodiment, the first and second run axes 730, 740 are substantially parallel. As can further be seen in FIG. 7, the container pressure delivery system valve member 704 is selectively rotatable between the first (shown) and second (not shown) positions relative to the container pressure delivery system body 702 about a rotation axis 750. Further in this embodiment, the rotation axis 750 is substantially parallel with the first 730 and second 740 run axes.

The body 702 of the container pressure regulator 700 of the container pressure delivery system 135 in accordance with some embodiments may include an engagement feature 786, such as gear teeth, a member of a joint, or other coupling feature. The body 702 may be supported for rotation about the rotation axis 750 on the work vehicle 100. In some embodiments, the rotation axis 750 may be substantially parallel to the vertical axis 126 (FIG. 1). The engagement feature 786 may be configured for driving rotation of the body 702 about the rotation axis 750 such as by control of an actuator 180 (FIG. 2) (e.g., an electric motor, a hydraulic actuator, a pneumatic actuator) based on one or more signals from the electric control system in accordance with an example embodiment.

In addition, the container pressure regulator 700 of the container pressure delivery system 135 in accordance with some embodiments may be operably attached to a linkage 260 (FIG. 2). The linkage 260 may be an elongate bar in some embodiments. The linkage 260 may be threaded and threadably attached to the engagement feature 786 of the body 702. In some embodiments, the linkage 260 is engaged with the engagement feature 786 as a worm drive; however, it will be appreciated that the linkage 260 may be configured differently without departing from the scope of the present disclosure. For example, in an additional embodiment, the linkage 260 may extend parallel to the axis 750 and may include a spur gear (not shown) that meshes with the engagement feature 786. In these various embodiments, rotation of the linkage 260 about its axis may drive rotation of the container pressure delivery system valve member 704 relative to the container pressure delivery system body 702 selectively between the first and second positions relative to the container pressure delivery system body 702.

Figure 8:
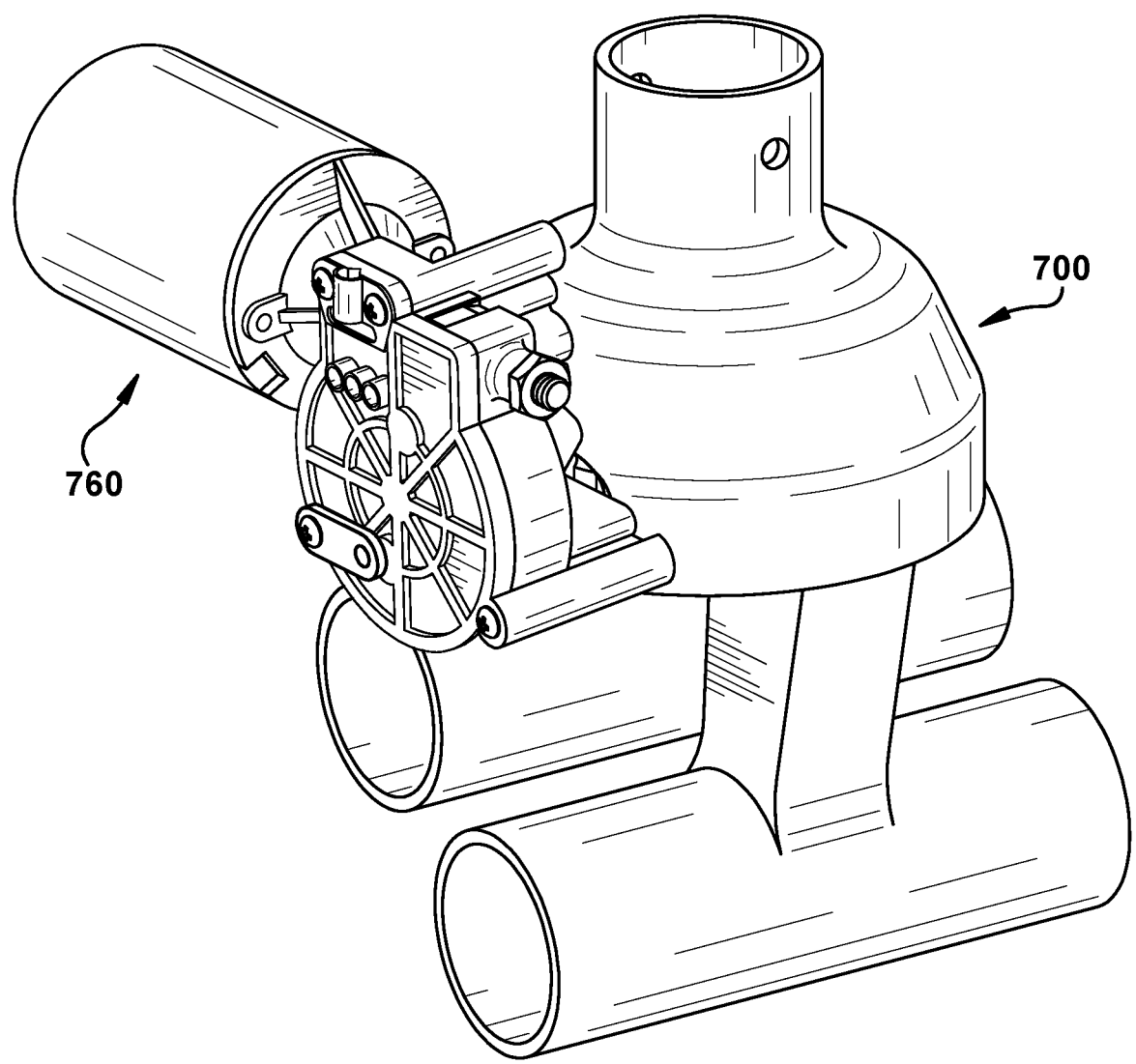
FIG. 8 is an isometric view of a commodity container pressure regulator that may be independently driven by an electric motor according to example embodiments.

In some embodiments and with reference next to FIG. 8, container pressure regulator 145, 700 of the container pressure delivery system 135 may be decoupled from the linkage 260 and controlled by a motor 760 separate from the actuator 180 (e.g., an electric motor, a hydraulic actuator, a pneumatic actuator), and the sensor(s) 201 (FIG. 2) may detect the current, actual position of the manifold regulators 161-167 and provide feedback to the processor 200 for closed-loop control of the container pressure regulator 700. As such, the separate motor 760 of the container pressure regulator 700 may continue to actuate in response to the detected the current, actual position of the manifold regulators 161-167.

In some embodiments and with continued reference to FIG. 8, the container pressure regulator 145, 700 of the container pressure delivery system 135 may be decoupled from the linkage 260 and controlled by the motor 760 separate from the actuator 180 (e.g., an electric motor, a hydraulic actuator, a pneumatic actuator), and the electric control may selectively generating first or second command control signals responsive to a selection input signal received via the interface 202 (FIG. 2) from an operator of the system. The actuator 180 may then, responsive to the first command control signal cause operation of the manifold regulators 161-167 in accordance with the first command control signal. Similarly, the motor 760 separate from the actuator 180 may then, responsive to the second command control signal cause operation of the container pressure regulator 700 in accordance with the second command control signal, wherein the second control signal may be based on the first control signal for the container pressure regulator 145, 700 to essentially "follow" the position of the manifold regulators 161-167 to control the direction of the fluid flow to the appropriate commodity container from the appropriate pressurized source for helping to match or otherwise balance the commodity container pressure with the commodity delivery path for control of siphoning and/or floating of the commodity as it is dispersed from a work vehicle.

Figure 9:
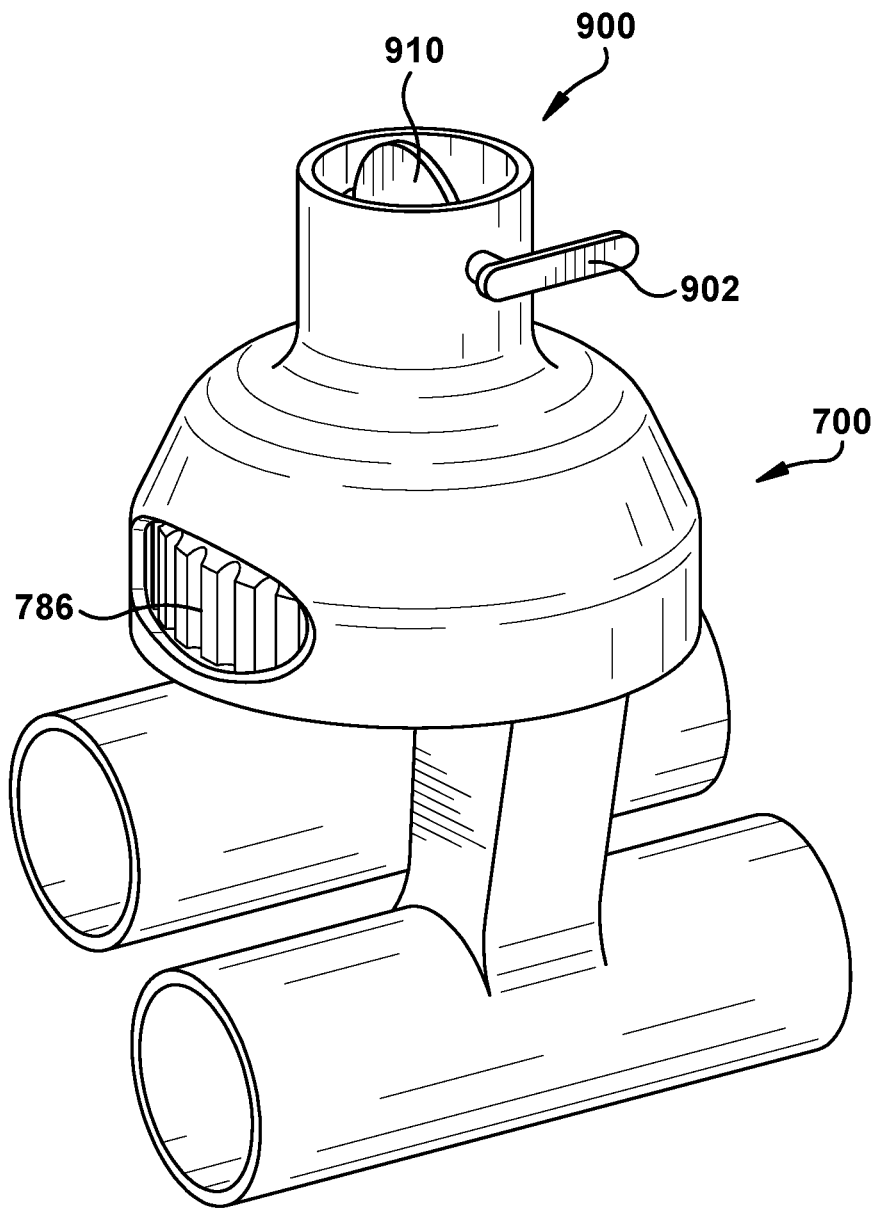
FIG. 9 is an isometric view of a commodity container pressure regulator that includes a pressure regulator that may be independently operated according to example embodiments.

In some embodiments and with reference next to FIG. 9, container pressure regulator 145, 700 of the container pressure delivery system 135 may include a pressure and/or flow restrictor 900. In FIG. 9, the pressure and/or flow restrictor 900 is a flow restrictor device 902 operable by an actuator (not shown) such as an electric motor, a hydraulic actuator, a pneumatic actuator, or the like to selectively restrict and/or otherwise throttle a first flow of the associated first fluid at the first pressure delivered to the commodity container 128" through the container pressure regulator 700 of the container pressure delivery system 135, or to restrict and/or otherwise throttle a second flow of the associated second fluid at the second pressure delivered to the commodity container 128" through the container pressure regulator 700 of the container pressure delivery system 135.

In some embodiments, the flow restrictor device 902 may be a butterfly valve 910 operable by an actuator (not shown) such as an electric motor, a hydraulic actuator, a pneumatic actuator, or the like to selectively restrict the first flow of the associated first fluid at the first pressure delivered to the commodity container 128" through the container pressure regulator 700 of the container pressure delivery system 135, or the second flow of the associated second fluid at the second pressure delivered to the commodity container 128" through the container pressure regulator 700 of the container pressure delivery system 135. Other equivalent flow restrictor and/or throttling devices may be used as well.

As mentioned above, in some embodiments, the container pressure delivery system 135 includes an integral flow restrictor system for helping to match or otherwise balance the commodity container pressure with the commodity delivery path for control of siphoning and/or floating of the commodity as it is dispersed from a work vehicle. In one example, the integrated flow restrictor system is a flow restrictor device selectively restricting a first flow of the associated first fluid at the first pressure delivered to the container 128", or a second flow of the associated second fluid at the second pressure delivered to the container 128". In example embodiments, the integrated flow restrictor system is provided based on the relative position between a valve member and a body of a container pressure regulator.

The container pressure delivery system in some embodiments includes a container pressure delivery system body, and a container pressure delivery system valve member that is selectively movable between first and second positions relative to the container pressure delivery system body. In an embodiment, the container pressure delivery system valve member in the first position relative to the container pressure delivery system body couples the container with the associated first fluid at the first pressure to pressurize the container to the first pressure. In an embodiment, the container pressure delivery system valve member in the second position relative to the container pressure delivery system body couples the container with the associated second fluid at the second pressure to pressurize the container to the second pressure, In an embodiment, the container pressure delivery system valve member disposed between the first and second positions relative to the container pressure delivery system body selectively: partially restricts a first flow of the associated first fluid at the first pressure delivered to the container, and completely restricts a second flow of the associated second fluid at the second pressure to block the second flow of the associated second fluid from flowing to the container, or partially restricts the second flow of the associated second fluid at the second pressure delivered to the container, and completely restricts the first flow of the associated first fluid at the first pressure to block the first flow of the associated second fluid from flowing to the container.

Figure 10A:
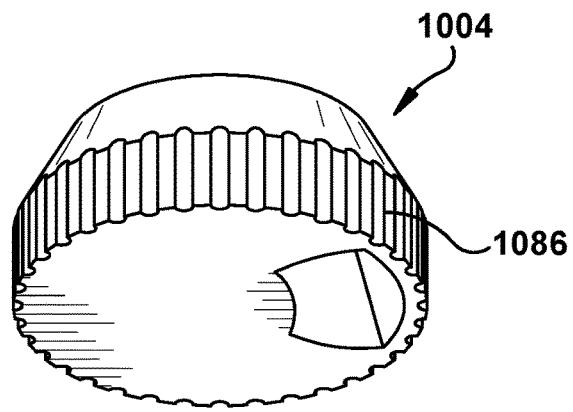
FIGS. 10a-10c are isometric views of a valve member of a commodity container pressure regulator forming an internal integrated a pressure regulator that may be independently driven by an electric motor according to example embodiments.
Figure 10B:
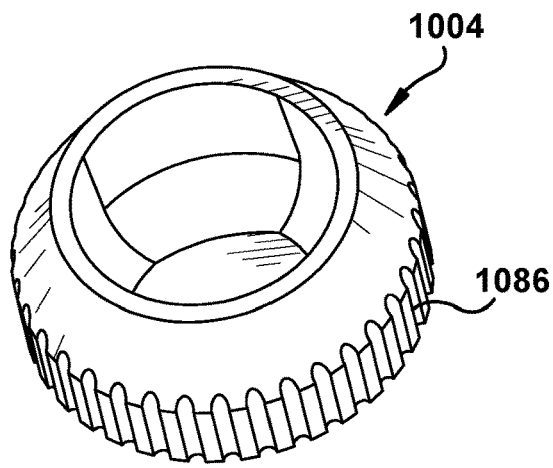
Figure 10C:
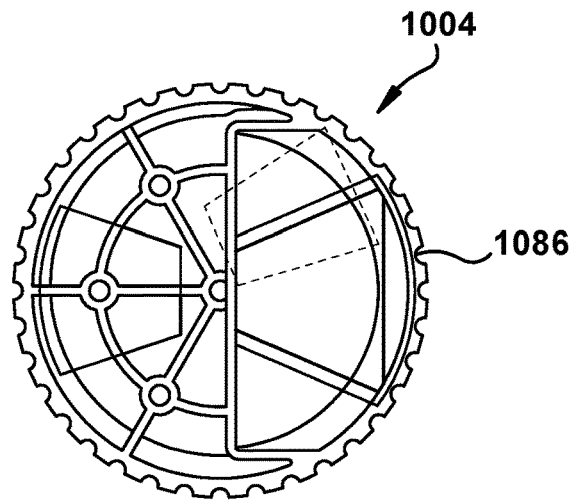

FIGS. 10*a*-10*c* show various views of a container pressure delivery system valve member 1004 usable in the container pressure delivery system body 702 of the container pressure regulator 700 of FIG. 7 for providing an integrated flow restriction and/or throttling. The container pressure delivery system valve member 1004 is selectively rotatable between first and second positions relative to the container pressure delivery system body 702. As shown in FIG. 11 *a* for example, the container pressure delivery system valve member 1004 selectively rotated to the first position relative to the container pressure delivery system body 702 of the example embodiment of the container pressure delivery system 135 cooperatively defines with the container pressure delivery system body 702 a first un-throttled channel configuration 1102 for communicating a full flow of the associated first fluid to the commodity container 128" for pressurizing the container using the pressure of the associated pressurized first fluid.

Figure 11A:
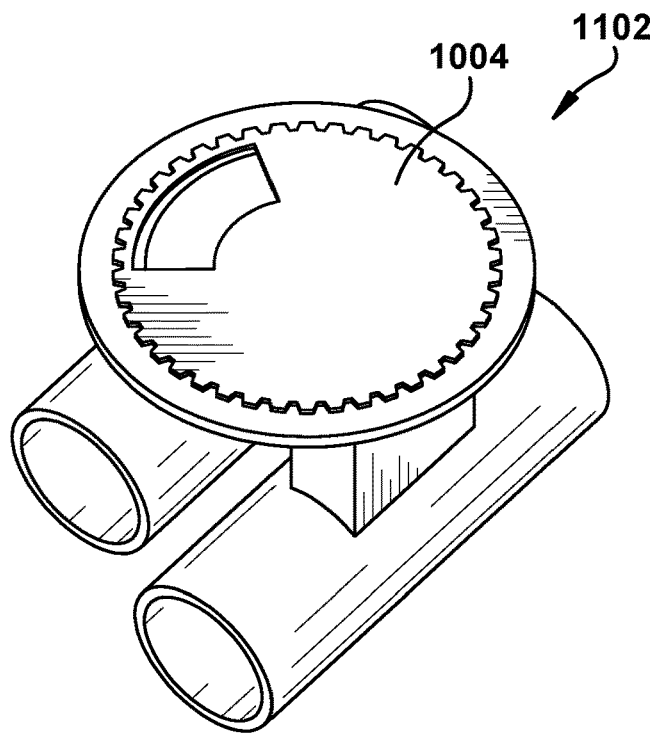
FIGS. 11a-11d are isometric views of the valve member of FIGS. 10a-10c shown in various positions relative to a valve body for varying the pressure delivered to a commodity container according to example embodiments.
Figure 11B:
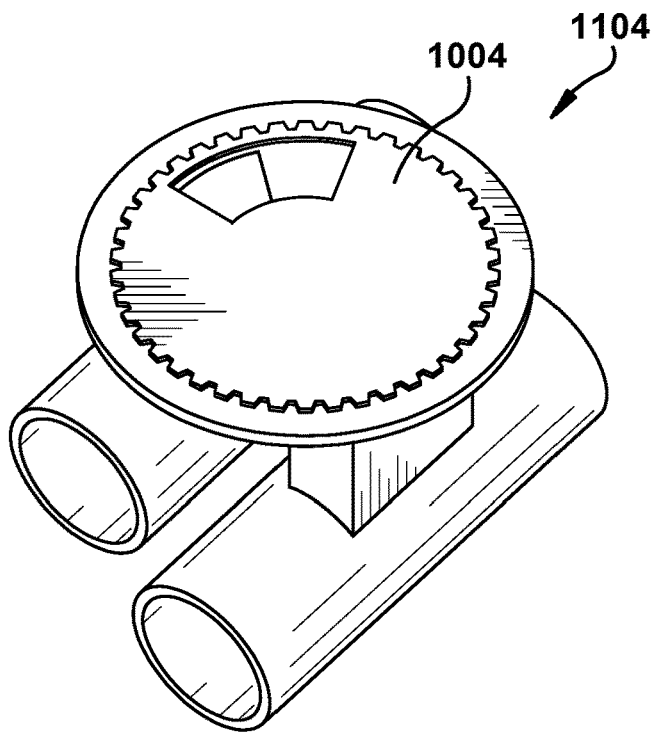
Figure 11C:
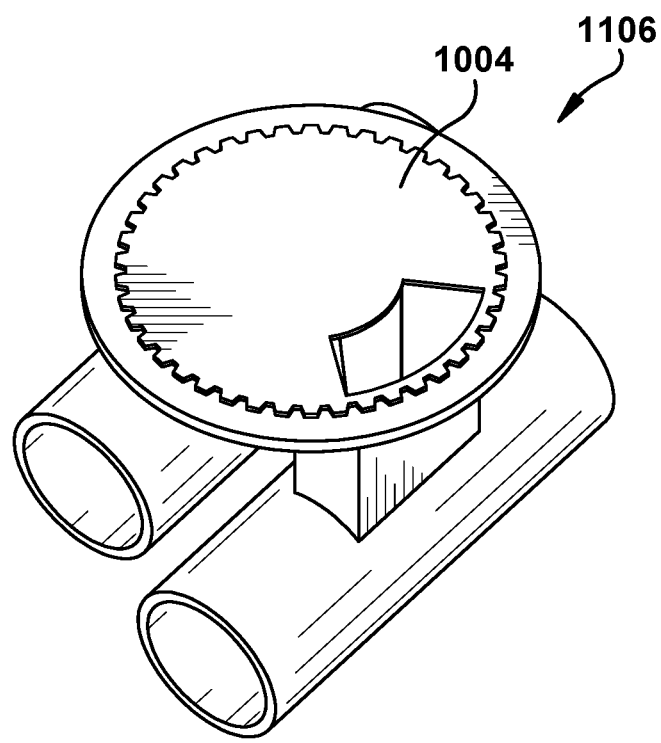

As shown in FIG. 11*c*, the container pressure delivery system valve member 1004 selectively rotated to the second position relative to the container pressure delivery system body 702 of the container pressure delivery system 135 cooperatively defines with the container pressure delivery system body 702 a second channel configuration 1106 for communicating a full flow of the associated second fluid to the commodity container 128" for pressurizing the container using the full pressure of the associated pressurized second fluid.

Figure 11D:
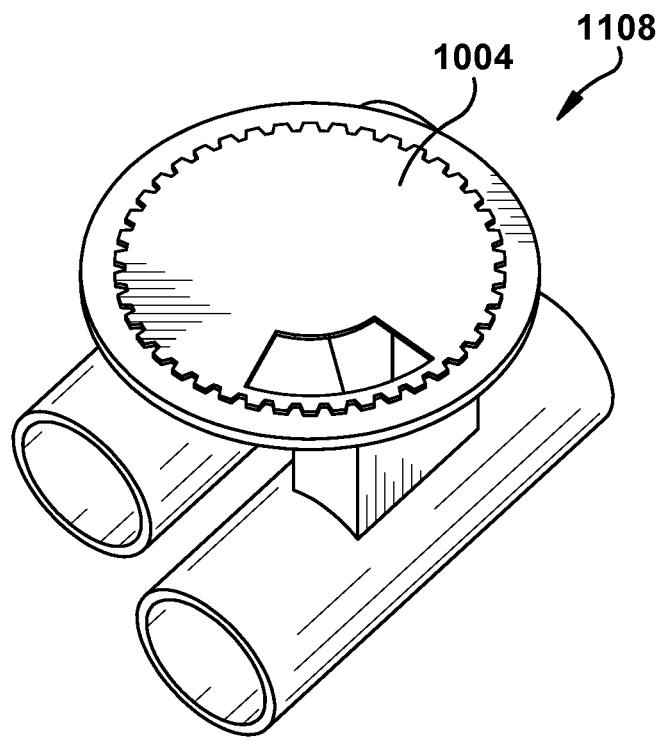

As shown in FIGS. 11*b* and 11*d*, the container pressure delivery system valve member 1004 disposed between the first and second positions relative to the body 702 may selectively restrict a first flow of the associated first fluid at the first pressure delivered to the container, or a second flow of the associated second fluid at the second pressure delivered to the commodity container 128". With the container pressure delivery system valve member 1004 disposed between the first and second positions relative to the body 702 such as shown in FIG. 11*b*, the container pressure delivery system 135 of the example embodiment may selectively define third channel configuration 1104 restricting the first flow of the associated first fluid at the first pressure delivered to the container in the range of 0-100%, and completely restricting the second flow of the associated second fluid, thereby blocking the second flow of the associated second fluid from flowing to the container. Similarly, with the container pressure delivery system valve member 1004 disposed between the first and second positions relative to the body 702 such as shown in FIG. 11*d*, the container pressure delivery system 135 of the example embodiment may selectively define fourth channel configuration 1108 restricting the second flow of the associated second fluid at the second pressure delivered to the container in the range of 0-100%, and completely restricting the first flow of the associated first fluid, thereby blocking the first flow of the associated first fluid from flowing to the container.

It is to be appreciated that the container pressure delivery system valve member 1004 may be rotated to positions 90° in either direction from the positions shown in FIGS. 11*a* and 11*c*, wherein the container pressure delivery system valve member 1004 completely restricts both the first and second flows of the associated first and second fluids, thereby blocking both of the first and second flows of the associated first and second fluids from flowing to the container as may be necessary or desired.

Figure 12A:
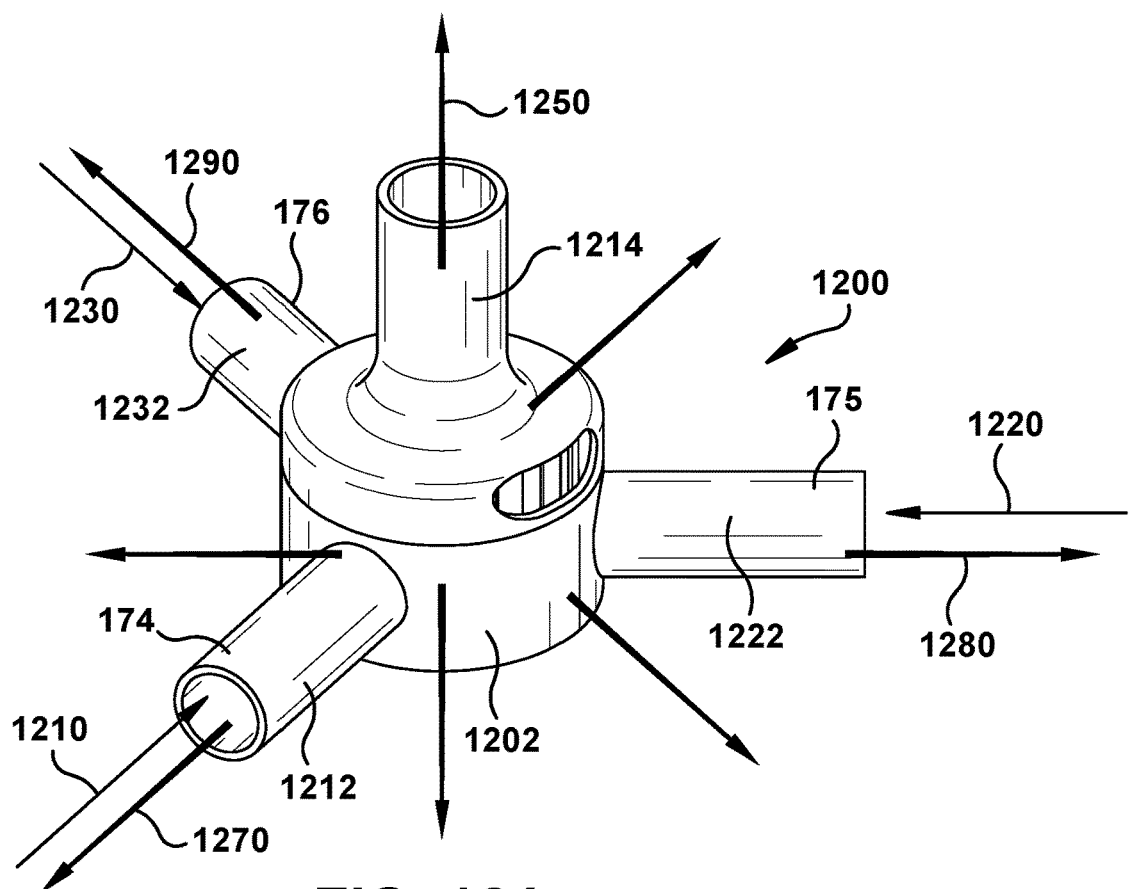
FIGS. 12a and 12b are isometric views of a commodity container pressure regulator that may be independently operated according to example embodiments.
Figure 12B:
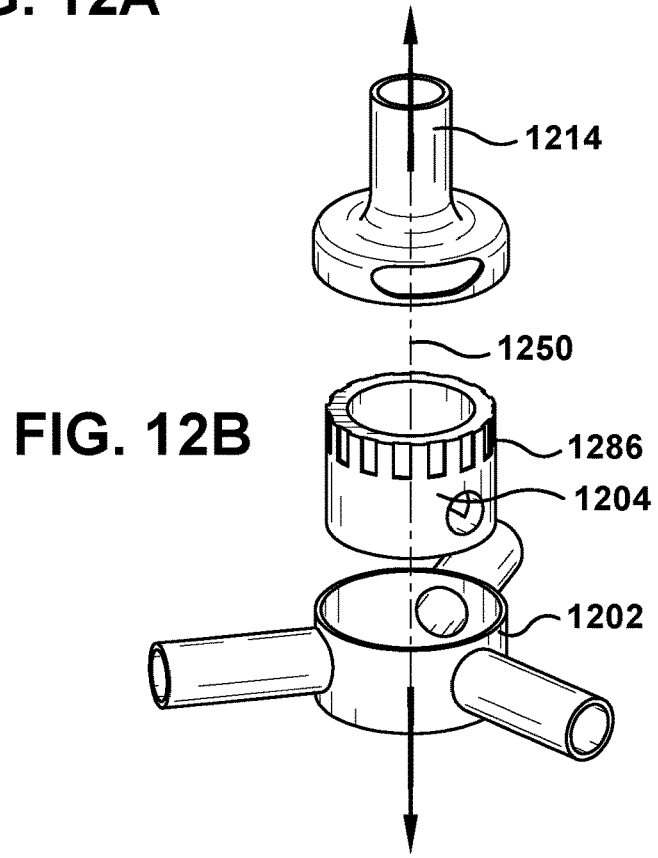

FIGS. 12*a* and 12*b* show a container pressure regulator 1200 of the container pressure delivery system 135 in accordance with some embodiments. As shown there, the container pressure regulator 1200 includes a container pressure delivery system body 1202, and a container pressure delivery system valve member 1204 that is selectively rotatable between first (not shown), second (as shown), and third (not shown) positions relative to the container pressure delivery system body 1202.

The container pressure delivery system valve member 1204 selectively rotated to the first position (not shown) relative to the container pressure delivery system body 1202 of the container pressure delivery system 135 cooperatively defines with the container pressure delivery system body 1202 a first channel configuration 1210. The first channel configuration 1210 has a first inlet 1212 in operative fluid communication with the associated pressurized first fluid flowing through the first run passage 174 and disconnected from the associated pressurized second and third fluids flowing through the second and third run passages 175, 176, and a common outlet 1214 in operative fluid communication with the commodity container 128" for communicating the associated first fluid to the commodity container for pressurizing the container using the pressure of the associated pressurized first fluid.

The container pressure delivery system valve member 1204 selectively rotated to the second position relative to the container pressure delivery system body 1202 of the container pressure delivery system 135 as shown cooperatively defines with the container pressure delivery system body 1202 a second channel configuration 1220. The second channel configuration has a second inlet 1222 in operative fluid communication with the associated pressurized second fluid flowing through the second run passage 175 and disconnected from the associated pressurized first and third fluids flowing through the first and third run passages 174, 176, and the common outlet 1214 shared with the first channel configuration 1210 and also in operative fluid communication with the commodity container 128" for communicating the associated second fluid to the commodity container for pressurizing the container using the pressure of the associated pressurized second fluid.

The container pressure delivery system valve member 1204 selectively rotated to the third position (not shown) relative to the container pressure delivery system body 1202 of the container pressure delivery system 135 cooperatively defines with the container pressure delivery system body 1202 a third channel configuration 1230. The third channel configuration 1230 has a third inlet 1232 in operative fluid communication with the associated pressurized third fluid flowing through the third run passage 176 and disconnected from the associated pressurized first and second fluids flowing through the first and second run passages 174, 175, and the common outlet 1214 in operative fluid communication with the commodity container 128" for communicating the associated third fluid to the commodity container for pressurizing the container using the pressure of the associated pressurized third fluid.

As can be seen in FIGS. 12*a* and 12*b*, the first channel configuration 1210 extends along a first run axis 1270, the second channel configuration 1220 extends along a second run axis 1280, and the third channel configuration 1230 extends along a third run axis 1290. In this embodiment, the first, second, and third run axes 1270, 1280, and 1290 are substantially co-planar. As can further be seen in FIGS. 12*a* and 12*b*, the container pressure delivery system valve member 1204 is selectively rotatable between the first (not shown), the second (shown), and third (not shown) positions relative to the container pressure delivery system body 1202 along a rotation axis 1250. Further in this embodiment, the rotation axis 1250 is substantially perpendicular with the first 1270, second 1280, and third 1290 run axes.

The body 1202 of the container pressure regulator 1200 of the container pressure delivery system 135 in accordance with some embodiments may include an engagement feature 1286, such as gear teeth, a member of a joint, or other coupling feature. The body 1202 may be supported for rotation about the rotation axis 1250 on the work vehicle 100. In some embodiments, the rotation axis 1250 may be substantially parallel to the vertical axis 126 (FIG. 1). The engagement feature 1286 may be configured for driving translation of the body 1202 about the rotation axis 1250 such as by control of an actuator 180 (FIG. 2) (e.g., an electric motor, a hydraulic actuator, a pneumatic actuator) based on one or more signals from the electric control system in accordance with an example embodiment.

In addition, the container pressure regulator 1200 of the container pressure delivery system 135 in accordance with some embodiments may be operably attached to a linkage 260 (FIG. 2). The linkage 260 may be an elongate bar in some embodiments. The linkage 260 may be threaded and threadably attached to the engagement feature 1286 of the body 1202. In some embodiments, the linkage 260 is engaged with the engagement feature 1286 as a worm drive; however, it will be appreciated that the linkage 260 may be configured differently without departing from the scope of the present disclosure. For example, in an additional embodiment, the linkage 260 may extend parallel to the axis 1250 and may include a spur gear that meshes with the engagement feature 1286. In these various embodiments, rotation of the linkage 260 about its axis may drive rotation of the container pressure regulator 1200 about the rotation axis 1250.

In further addition, the position of the container pressure delivery system valve member 1204 relative to the container pressure delivery system body 1202 may be used to selectively restrict or otherwise throttle the flow from the inlets 1212, 1222, 1232 to the outlet 1214 for more precisely pressurizing the commodity container to match or balance against the pressure in the selected commodity run as may be necessary or desired. In this regard, the container pressure delivery system valve member 1204 may be selectively rotated less than fully to the first position described above relative to the container pressure delivery system body 1202 of the container pressure delivery system 135 to cooperatively define together with the container pressure delivery system body 1202 a flow restriction in the first channel configuration 1210 for controlling the flow and correspondingly the pressure delivered to the commodity tank. Similarly, the container pressure delivery system valve member 1204 may be selectively rotated less than fully to the second position described above relative to the container pressure delivery system body 1202 of the container pressure delivery system 135 to cooperatively define together with the container pressure delivery system body 1202 a flow restriction in the second channel configuration 1220 for controlling the flow and correspondingly the pressure delivered to the commodity tank. Also similarly, the container pressure delivery system valve member 1204 may be selectively rotated less than fully to the third position described above relative to the container pressure delivery system body 1202 of the container pressure delivery system 135 to cooperatively define together with the container pressure delivery system body 1202 a flow restriction in the third channel configuration 1230 for controlling the flow and correspondingly the pressure delivered to the commodity tank.

The container pressure delivery system valve member 1204 may be selectively rotated less than fully to the first position described above relative to the container pressure delivery system body 1202 of the container pressure delivery system 135 to cooperatively define together with the container pressure delivery system body 1202 the flow restriction in the first channel configuration 1210, and completely restricting the flow of the pressurized fluid through the remainder of the inlets 1222, 1232 to the outlet 1214. Similarly, the container pressure delivery system valve member 1204 may be selectively rotated less than fully to the second position described above relative to the container pressure delivery system body 1202 of the container pressure delivery system 135 to cooperatively define together with the container pressure delivery system body 1202 a flow restriction in the second channel configuration 1220, and completely restricting the flow of the pressurized fluid through the remainder of the inlets 1212, 1232 to the outlet 1214. Also similarly, the container pressure delivery system valve member 1204 may be selectively rotated less than fully to the third position described above relative to the container pressure delivery system body 1202 of the container pressure delivery system 135 to cooperatively define together with the container pressure delivery system body 1202 a flow restriction in the third channel configuration 1230, and completely restricting the flow of the pressurized fluid through the remainder of the inlets 1212, 1222 to the outlet 1214.

It is to be appreciated that the container pressure delivery system body 1202 may be rotated to positions 60° in either direction from the first, second, and third channel configurations 1210, 1220, 1230 shown in FIGS. 12*a* and 12*b*, wherein the container pressure delivery system valve member 1202 completely restricts all of the first, second, and third flows of the associated fluids, thereby blocking each of the first, second, and third flows of the associated fluids from flowing to the container as may be necessary or desired.

Figure 13:
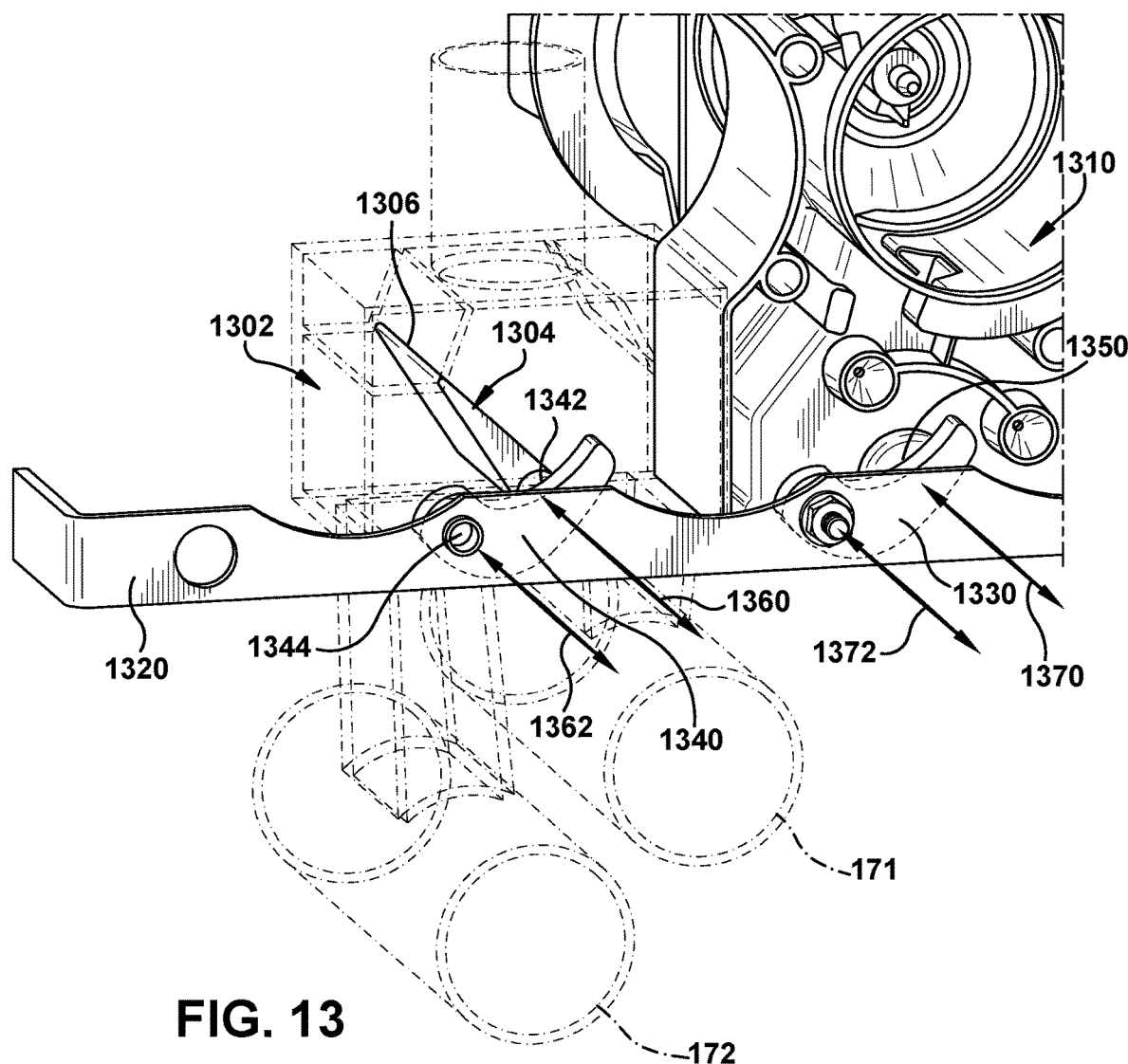
FIG. 13 is an isometric view of a linkage system in accordance with an example embodiment.

FIG. 13 is an isometric view of a linkage system 1300 in accordance with an example embodiment. As described above, in general, the container pressure delivery system valve member of the container pressure delivery system may be coupled with the manifold valve member of the commodity delivery system by a mechanical connection, an electrical connection, and/or a combination of both mechanical and electrical connections. A linkage system may be provided mechanically coupling the container pressure delivery system valve member of the container pressure delivery system with the manifold valve member of the commodity delivery system. At least one system motor is operable to drive the linkage system to effect relative movement between the container pressure delivery system valve member and the container pressure delivery system body, and between the manifold valve member and the body.

The linkage system 1300 of the embodiment shown in FIG. 13 includes plural bars and other members for mechanically coupling a container pressure regulator 1302 in accordance with a further example embodiment for movement with a manifold regulator 1310. The linkage includes a coupler member 1320 movable between first and second positions and first and second crank members 1330, 1340 each having opposite first and second ends. The first end 1332 of the first crank member 1330 may be attached with a manifold valve member 1350 of the manifold regulator 1310, and the second end 1334 of the first crank member 1330 may be pivotally attached with the coupler member 1320. Similarly, the first end 1342 of the second crank member 1340 may be attached with a container pressure delivery system valve member 1304 of the container pressure regulator 1302, and the second end 1344 of the second crank member 1340 may be pivotally attached with the coupler member 1320. In that way, movement of the coupler member may control operation of both the manifold valve member 1350 of the manifold regulator 1310 as well as the container pressure delivery system valve member 1304 of the container pressure regulator 1302 in accordance with an example embodiment. In the example embodiment the linkage system 1300 may be a four bar linkage, for example. Also in the example embodiment, the container pressure delivery system valve member 1304 of the container pressure regulator 1302 is provided as a flapper valve 1306 that may be pivoted about a pressure delivery system valve axis 1360 between left and right orientations as viewed from the drawing Figure for porting the pressurized fluid from the appropriate run structure 171, 172 for pressurizing the commodity container to match or balance against the pressure in the selected commodity run.

Also in the example embodiment, the movement of the coupler member is a non-linear movement which provides an added benefit of an over-the-center type motion for ensuring sure motion and good sealing of the commodity and pressure regulator valve members. As mentioned, the flapper valve 1306 that may be pivoted about a pressure delivery system valve axis 1360. Similarly, the manifold valve member 1350 may pivot about a manifold valve axis 1370. The pressure delivery system valve axis 1360 and the manifold valve axis 1370 extend in parallel. As further mentioned, the second end 1344 of the second crank member 1340 may be pivotally attached with the coupler member 1320 for rotation about an axis 1362, and the second end 1344 of the second crank member 1340 may be pivotally attached with the coupler member 1320 for rotation about an axis 1372. The axes 1362 and 1372 mutually extend in parallel. The coupler member 1320 may be moved between first and second positions such as for example to the left and to the right as viewed in the Figure. As the coupler member 1320 is moved between the first and second positions, the axes 1362 and 1372 rotate about the pressure delivery system valve axis 1360 and the manifold valve axis 1370, respectively.

In the example embodiment, the coupler member moved from the second position to the first position pivots the manifold valve member of the manifold regulator via the first crank member to its first position relative to the manifold body for distributing the associated commodity into the associated first fluid flowing in the first run structure of the plurality of delivery runs, and pivots the container pressure delivery system valve member via the second crank member to its first position relative to the container pressure delivery system body for communicating the associated first fluid to the container.

Further in the example embodiment, the coupler member moved from the first position to the second position pivots the manifold valve member of the manifold regulator via the first crank member to its second position relative to the manifold body for distributing the associated commodity into the associated second fluid flowing in the second run structure of the plurality of delivery runs, and pivots the container pressure delivery system valve member via the second crank member to its second position relative to the container pressure delivery system body for communicating the associated second fluid to the container.

Figure 14A:
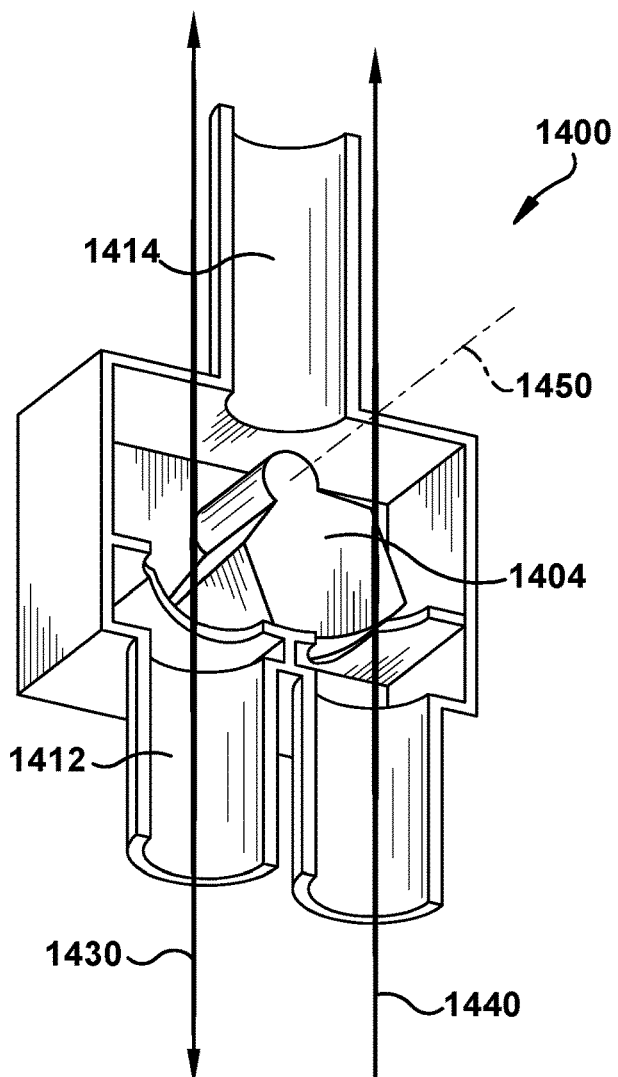
FIGS. 14a and 14b are isometric views of a commodity container pressure regulator that may be independently operated according to example embodiments.
Figure 14B:
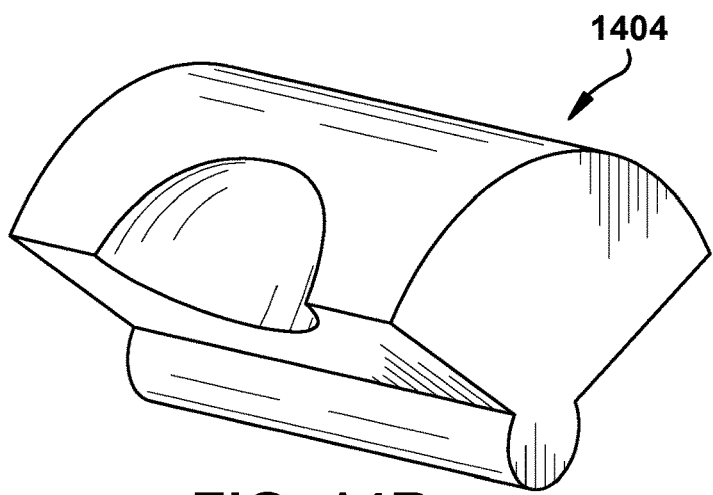

FIGS. 14a and 14b show a container pressure regulator 1400 of the container pressure delivery system 135 in accordance with some embodiments. As shown there, the container pressure regulator 1400 includes a container pressure delivery system body 1402, and a container pressure delivery system valve member 1404 that is selectively pivotable between first and second positions relative to the container pressure delivery system body 1402. The container pressure delivery system valve member 104 selectively pivoted to the first position relative to the container pressure delivery system body 1402 of the container pressure delivery system 135 cooperatively defines with the container pressure delivery system body 1402 a first channel configuration 1410. The first channel configuration 1410 has a first inlet 1412 in operative fluid communication with the associated pressurized first fluid flowing through the first run passage 174 and disconnected from the associated pressurized second fluid flowing through the second run passage 175, and a common outlet 1414 in operative fluid communication with the commodity container 128" for communicating the associated first fluid to the commodity container for pressurizing the container using the pressure of the associated pressurized first fluid. The container pressure delivery system valve member 1404 selectively pivoted to the second position (not shown) relative to the container pressure delivery system body 1402 of the container pressure delivery system 135 cooperatively defines with the container pressure delivery system body 1402 a second channel configuration 1420. The second channel configuration has a second inlet 1422 in operative fluid communication with the associated pressurized second fluid flowing through the second run passage 175 and disconnected from the associated pressurized first fluid flowing through the first run passage 174, and the common outlet 1414 shared with the first channel configuration 1410 and also in operative fluid communication with the commodity container 128" for communicating the associated second fluid to the commodity container for pressurizing the container using the pressure of the associated pressurized second fluid.

As can be seen in FIGS. 14a and 14b, the first channel configuration 1410 extends along a first run axis 1430, and the second channel configuration 1420 extends along a second run axis 1440. In this embodiment, the first and second run axes 1430, 1440 are substantially parallel. As can further be seen in FIGS. 14a and 14b, the container pressure delivery system valve member 1404 is selectively pivotable between the first (shown) and second (not shown) positions relative to the container pressure delivery system body 1402 about a pivot axis 1450. Further in this embodiment, the pivot axis 1450 is substantially perpendicular to the first 1430 and second 1440 run axes.

The body 1402 of the container pressure regulator 1400 of the container pressure delivery system 135 in accordance with some embodiments may include an engagement feature 1486, such as gear teeth, a member of a joint, or other coupling feature. The body 1402 may be supported for pivotal movement about the pivot axis 1450 on the work vehicle 100. In some embodiments, the pivot axis 1450 may be substantially parallel to the horizontal axis 118 (FIG. 1). The engagement feature 1486 may be configured for driving the pivotal movement of the body 1402 about the pivot axis 1450 such as by control of an actuator 180 (FIG. 2) (e.g., an electric motor, a hydraulic actuator, a pneumatic actuator) based on one or more signals from the electric control system in accordance with an example embodiment.

In addition, the container pressure regulator 1400 of the container pressure delivery system 135 in accordance with some embodiments may be operably attached to a linkage 260 (FIG. 2). The linkage 260 may be an elongate bar in some embodiments. The linkage 260 may be threaded and threadably attached to the engagement feature 1486 of the body 1402. In some embodiments, the linkage 260 is engaged with the engagement feature 1486 as a worm drive; however, it will be appreciated that the linkage 260 may be configured differently without departing from the scope of the present disclosure. For example, in an additional embodiment, the linkage 260 may extend parallel to the axis 1450 and may include a spur gear that meshes with the engagement feature 1486. In these various embodiments, rotation of the linkage 260 about its axis may drive the pivotable movement of the container pressure regulator 1400 about the pivot axis 1450.

Figure 15:
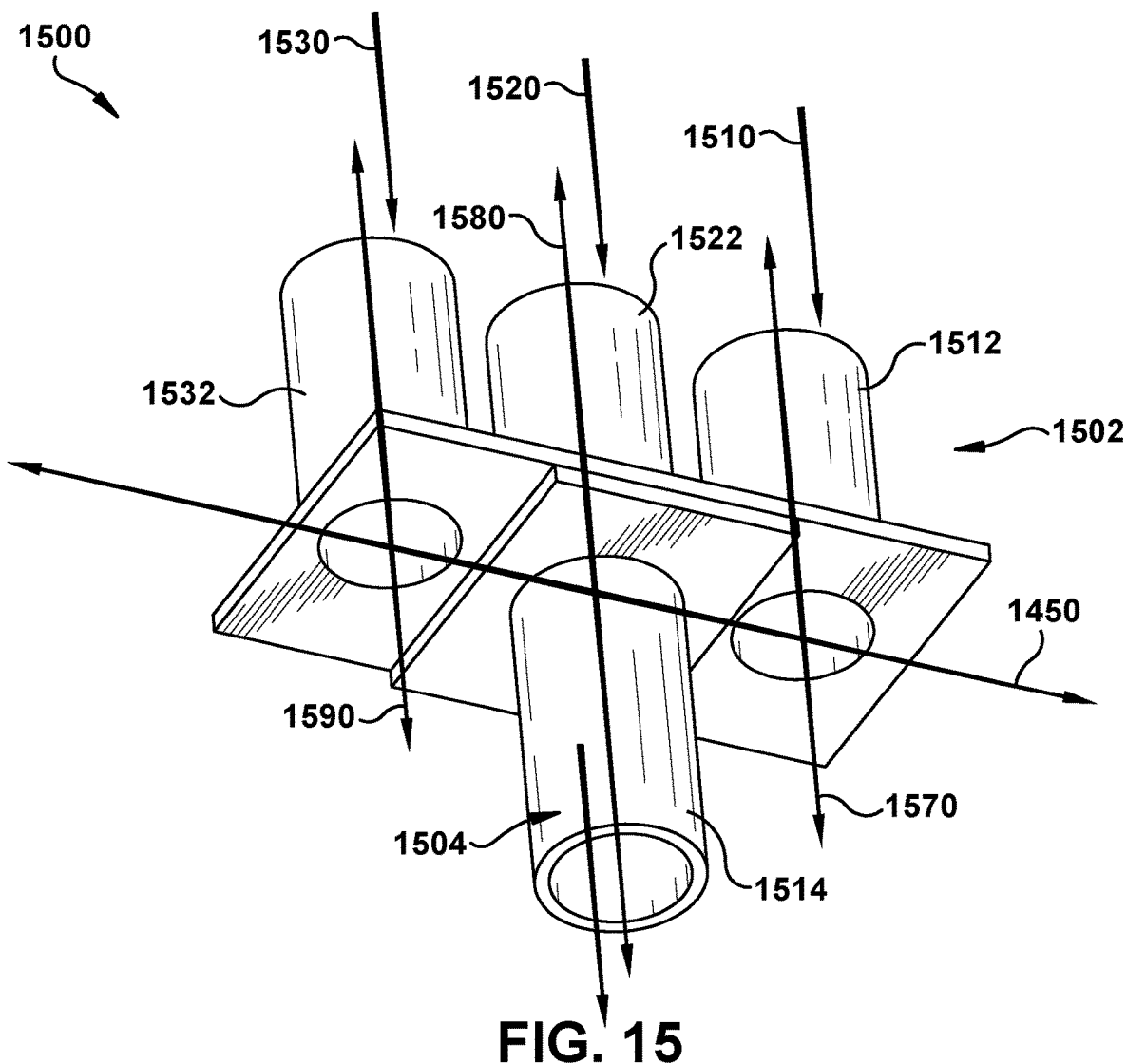
FIG. 15 is an isometric view of a commodity container pressure regulator that may be independently driven by an electric motor according to example embodiments.

FIG. 15 shows a container pressure regulator 1500 of the container pressure delivery system 135 in accordance with some embodiments. As shown there, the container pressure regulator 1500 includes a container pressure delivery system body 1502, and a container pressure delivery system valve member 1504 that is selectively translatable between first (not shown), second (as shown), and third (not shown) positions relative to the container pressure delivery system body 1502.

The container pressure delivery system valve member 1504 selectively translated to the first position (not shown) relative to the container pressure delivery system body 1502 of the container pressure delivery system 135 cooperatively defines with the container pressure delivery system body 1502 a first channel configuration 1510. The first channel configuration 1510 has a first inlet 1512 in operative fluid communication with the associated pressurized first fluid flowing through the first run passage 174 and disconnected from the associated pressurized second and third fluids flowing through the second and third run passages 175, 176, and a common outlet 1514 in operative fluid communication with the commodity container 128" for communicating the associated first fluid to the commodity container for pressurizing the container using the pressure of the associated pressurized first fluid.

Translation of the container pressure delivery system valve member 1504 to positions near to but not fully at the first position (not shown) relative to the container pressure delivery system body 1502 of the container pressure delivery system 135 may be used to restrict the flow of the associated first fluid at the first pressure delivered to the container in the range of 0-100%. The first inlet 1512 not being in full coincident alignment with the common or shared outlet 1514 of the container pressure delivery system valve member 1504 renders the controlled restriction in the example embodiment in the range of 0-100% by the amount of mechanical displacement from the full coincident alignment. In this position the other channel configurations 1520, 1530 are completely restricted preventing the flow of the associated fluids flowing to the commodity container.

The container pressure delivery system valve member 1504 selectively translated to the second position relative to the container pressure delivery system body 1502 of the container pressure delivery system 135 as shown cooperatively defines with the container pressure delivery system body 1502 a second channel configuration 1520. The second channel configuration has a second inlet 1522 in operative fluid communication with the associated pressurized second fluid flowing through the second run passage 175 and disconnected from the associated pressurized first and third fluids flowing through the first and third run passages 174, 176, and the common outlet 1514 shared with the first channel configuration 1510 and also in operative fluid communication with the commodity container 128" for communicating the associated second fluid to the commodity container for pressurizing the container using the pressure of the associated pressurized second fluid.

Translation of the container pressure delivery system valve member 1504 to positions near to but not fully at the second position as shown relative to the container pressure delivery system body 1502 of the container pressure delivery system 135 may be used to restrict the flow of the associated second fluid at the second pressure delivered to the container in the range of 0-100%. The second inlet 1522 not being in full coincident alignment with the common or shared outlet 1514 of the container pressure delivery system valve member 1504 renders the controlled restriction in the example embodiment in the range of 0-100% by the amount of mechanical displacement from the full coincident alignment. In this position the other channel configurations 1510, 1530 are completely restricted preventing the flow of the associated fluids flowing to the commodity container.

The container pressure delivery system valve member 1504 selectively translated to the third position (not shown) relative to the container pressure delivery system body 1502 of the container pressure delivery system 135 cooperatively defines with the container pressure delivery system body 1502 a third channel configuration 1530. The third channel configuration 1530 has a first inlet 1532 in operative fluid communication with the associated pressurized third fluid flowing through the third run passage 176 and disconnected from the associated pressurized first and second fluids flowing through the first and second run passages 174, 175, and the common outlet 1514 in operative fluid communication with the commodity container 128" for communicating the associated third fluid to the commodity container for pressurizing the container using the pressure of the associated pressurized third fluid.

Translation of the container pressure delivery system valve member 1504 to positions near to but not fully at the third position (not shown) relative to the container pressure delivery system body 1502 of the container pressure delivery system 135 may be used to restrict the flow of the associated third fluid at the third pressure delivered to the container in the range of 0-100%. The third inlet 1532 not being in full coincident alignment with the common or shared outlet 1514 of the container pressure delivery system valve member 1504 renders the controlled restriction in the example embodiment in the range of 0-100% by the amount of mechanical displacement from the full coincident alignment. In this position the other channel configurations 1510, 1520 are completely restricted preventing the flow of the associated fluids flowing to the commodity container.

As can be seen in FIG. 15, the first channel configuration 1510 extends along a first run axis 1570, the second channel configuration 1520 extends along a second run axis 1580, and the third channel configuration 1530 extends along a third run axis 1590. In this embodiment, the first, second, and third run axes 1570, 1580, and 1590 are substantially parallel. As can further be seen in FIG. 15, the container pressure delivery system valve member 1504 is selectively translatable between the first (not shown), the second (shown), and third (not shown) positions relative to the container pressure delivery system body 1502 along a translation axis 1550. Further in this embodiment, the translation axis 1550 is substantially perpendicular with the first 1570, second 1580, and third 1590 run axes.

It is to be appreciated that the container pressure delivery system body 1202 may be rotated to positions 60° in either direction from the first, second, and third channel configurations 1210, 1220, 1230 shown in FIGS. 12a and 12b, wherein the container pressure delivery system valve member 1202 completely restricts all of the first, second, and third flows of the associated fluids, thereby blocking each of the first, second, and third flows of the associated fluids from flowing to the container as may be necessary or desired.

The body 1502 of the container pressure regulator 1500 of the container pressure delivery system 135 in accordance with some embodiments may include an engagement feature 1586, such as gear teeth, a member of a joint, or other coupling feature. The body 1502 may be supported for translation along the translation axis 1550 on the work vehicle 100. In some embodiments, the translation axis 1550 may be substantially parallel to the horizontal axis 118 (FIG. 1). The engagement feature 1586 may be configured for driving translation of the body 1502 along the translation axis 1550 such as by control of an actuator 180 (FIG. 2) (e.g., an electric motor, a hydraulic actuator, a pneumatic actuator) based on one or more signals from the electric control system in accordance with an example embodiment.

In addition, the container pressure regulator 1500 of the container pressure delivery system 135 in accordance with some embodiments may be operably attached to a linkage 260 (FIG. 2). The linkage 260 may be an elongate bar in some embodiments. The linkage 260 may be threaded and threadably attached to the engagement feature 1586 of the body 1502. In some embodiments, the linkage 260 is engaged with the engagement feature 1586 as a worm drive; however, it will be appreciated that the linkage 260 may be configured differently without departing from the scope of the present disclosure. For example, in an additional embodiment, the linkage 260 may extend parallel to the axis 1550 and may include a spur gear that meshes with the engagement feature 1586. In these various embodiments, rotation of the linkage 260 about its axis may drive translation of the container pressure regulator 1500 along the translation axis 1550.

Also, the following examples are provided, which are referred to by ordinal numbers for easier description and understanding of the example embodiments.

In accordance with a first example embodiment a work vehicle is provided comprising: a container storing an associated commodity; a commodity delivery system operatively coupled with the container, the commodity delivery system being configured to receive the associated commodity from the container and distribute the associated commodity between a plurality of delivery runs, the commodity delivery system comprising: a first run structure defining a first run passage configured to receive an associated first fluid flowing from an associated first source at a first pressure; a second run structure defining a second run passage configured to receive an associated second fluid flowing from an associated second source at a second pressure; and a manifold regulator operatively coupled with the first and second run structures, the manifold regulator defining a manifold body and a manifold valve member that is selectively movable between first and second positions relative to the manifold body, the manifold valve member in the first position relative to the manifold body distributing the associated commodity into the associated first fluid flowing in the first run structure of the plurality of delivery runs, and the manifold valve member in the second position relative to the manifold body distributing the associated commodity into the associated second fluid flowing in the second run structure of the plurality of delivery runs; a container pressure delivery system operatively coupled with the container and with the commodity delivery system, the container pressure delivery system selectively fluid coupling the container storing the associated commodity with: the associated first fluid at the first pressure, or the associated second fluid at the second pressure; and a control system operably coupling the container pressure delivery system with the commodity delivery system, the control system being responsive to an associated selection signal to coordinate operation of: the manifold valve member selectively in the first position relative to the manifold body with the container pressure delivery system fluid selectively coupling the container with the associated first fluid at the first pressure to pressurize the container to the first pressure, and the manifold valve member selectively in the second position relative to the manifold body with the container pressure delivery system fluid selectively coupling the container with the associated second fluid at the second pressure to pressurize the container to the second pressure.

In accordance with a second example embodiment a work vehicle is provided according to the first example embodiment, wherein the container pressure delivery system comprises a container pressure regulator comprising: a container pressure delivery system body; and a container pressure delivery system valve member that is selectively movable between first and second positions relative to the container pressure delivery system body, the container pressure delivery system valve member in the first position relative to the container pressure delivery system body coupling the container with the associated first fluid at the first pressure to pressurize the container to the first pressure, and the container pressure delivery system valve member in the second position relative to the container pressure delivery system body coupling the container with the associated second fluid at the second pressure to pressurize the container to the second pressure.

In accordance with a third example embodiment a work vehicle is provided according to any of example embodiments 1-2, wherein the control system comprises: a linkage system mechanically coupling the container pressure delivery system valve member of the container pressure delivery system with the manifold valve member of the commodity delivery system; and at least one system motor operable to drive the linkage system to effect relative movement between the container pressure delivery system valve member and the container pressure delivery system body, and between the manifold valve member and the manifold body.

In accordance with a fourth example embodiment a work vehicle is provided according to any of example embodiments 1-3, wherein the control system comprises: an electric control system comprising a manifold regulator position sensor operably coupled with the manifold regulator of the commodity delivery system, the manifold regulator position sensor selectively generating a first signal responsive to the manifold valve member being in the first position relative to the manifold body, and the manifold regulator position sensor selectively generating a second signal responsive to the manifold valve member being in the second position relative to the manifold body; and a container pressure delivery system motor operable to effect relative movement between the container pressure delivery system valve member and the container pressure delivery system body, the container pressure delivery system motor selectively moving the container pressure delivery system valve member to the first position relative to the container pressure delivery system body responsive to the first signal selectively generated by the manifold regulator position sensor for coupling the container with the associated first fluid at the first pressure, and the container pressure delivery system motor selectively moving the container pressure delivery system valve member to the second position relative to the container pressure delivery system body responsive to the second signal selectively generated by the manifold regulator position sensor for coupling the container with the associated second fluid at the first pressure.

In accordance with a fifth example embodiment a work vehicle is provided according to any of example embodiments 1-4, wherein the control system comprises: an electric control system comprising a command control signal generator selectively generating first or second command control signals responsive to a selection input signal; a manifold motor operable to effect relative movement between the manifold valve member and the manifold body, the manifold motor selectively moving the manifold valve member to the first position relative to the manifold body responsive to the first command control signal selectively generated by the command control signal generator for distributing the associated commodity into the associated first fluid flowing in the first run structure of the plurality of delivery runs, and manifold motor selectively moving the manifold valve member to the second position relative to the manifold body responsive to the second command control signal selectively generated by the command control signal generator for distributing the associated commodity into the associated second fluid flowing in the second run structure of the plurality of delivery runs; and a container pressure delivery system motor operable to effect relative movement between the container pressure delivery system valve member and the container pressure delivery system body, the container pressure delivery system motor selectively moving the container pressure delivery system valve member to the first position relative to the container pressure delivery system body responsive to the first command control signal selectively generated by the command control signal generator for coupling the container with the associated first fluid at the first pressure, and the container pressure delivery system motor selectively moving the container pressure delivery system valve member to the second position relative to the container pressure delivery system body responsive to the second command control signal selectively generated by the command control signal generator for coupling the container with the associated second fluid at the second pressure.

In accordance with a sixth example embodiment a work vehicle is provided according to any of example embodiments 1-5, wherein the container pressure delivery system comprises a flow restricting device selectively restricting: a first flow of the associated first fluid at the first pressure delivered to the container, or a second flow of the associated second fluid at the second pressure delivered to the container.

In accordance with a seventh example embodiment a work vehicle is provided according to any of examples 1-6, wherein the container pressure delivery system comprises: a container pressure delivery system body; and a container pressure delivery system valve member that is selectively movable between first and second positions relative to the container pressure delivery system body, wherein the container pressure delivery system valve member in the first position relative to the container pressure delivery system body couples the container with the associated first fluid at the first pressure to pressurize the container to the first pressure, wherein the container pressure delivery system valve member in the second position relative to the body couples the container with the associated second fluid at the second pressure to pressurize the container to the second pressure, wherein the container pressure delivery system valve member disposed between the first and second positions relative to the body selectively restricts: a first flow of the associated first fluid at the first pressure delivered to the container, or a second flow of the associated second fluid at the second pressure delivered to the container.

In accordance with an eight example embodiment a work vehicle is provided according to any of examples 1-7, wherein the container pressure delivery system comprises a container pressure regulator comprising: a container pressure delivery system body; and a container pressure delivery system valve member that is selectively rotatable between first and second positions relative to the container pressure delivery system body, wherein the container pressure delivery system valve member selectively rotated to the first position relative to the container pressure delivery system body of the container pressure delivery system cooperatively defines together with the container pressure delivery system body a first channel configuration having: a first inlet in operative fluid communication with the associated first fluid and disconnected from the associated second fluid; and a common outlet in operative fluid communication with the container for communicating associated first fluid to the container and, wherein the container pressure delivery system valve member selectively rotated to the second position relative to the container pressure delivery system body of the container pressure delivery system cooperatively defines together with the container pressure delivery system body a second channel configuration having: a second inlet in operative fluid communication with the associated second fluid and disconnected from the associated first fluid; and the common outlet in operative fluid communication with the container for communicating associated first fluid to the container.

In accordance with a ninth example embodiment a work vehicle is provided according to the eight example, wherein the first channel configuration extends along a first run axis; the second channel configuration extends along a second run axis; the first and second run axes are substantially parallel; and the container pressure delivery system valve member is selectively rotatable between the first and second positions relative to the container pressure delivery system body about a rotation axis substantially parallel with the first and second run axes.

The work vehicle according to example 9, wherein the common outlet of the first and second channel configurations extends along a first run axis; the first inlet of the first channel configuration extends along a first inlet run axis perpendicular to the first run axis; the second inlet of the second channel configuration extends along a second inlet run axis perpendicular to the first run axis and co-planar with the first inlet run axis; and the container pressure delivery system valve member is selectively rotatable between the first and second positions relative to the container pressure delivery system body about a rotation axis substantially parallel with the first run axis and perpendicular to the first and second inlet run axes.

In accordance with an eleventh example embodiment a work vehicle is provided according to any of examples 1-7, wherein the container pressure delivery system comprises a container pressure regulator comprising: a container pressure delivery system body; and a container pressure delivery system valve member that is selectively pivotable between first and second positions relative to the container pressure delivery system body, wherein the container pressure delivery system valve member selectively pivoted to the first position relative to the container pressure delivery system body of the container pressure delivery system cooperatively defines together with the container pressure delivery system body a first channel configuration having a first inlet in operative fluid communication with the associated first fluid and disconnected from the associated second fluid and a common outlet in operative fluid communication with the container for communicating associated first fluid to the container and, wherein the container pressure delivery system valve member selectively pivoted to the second position relative to the container pressure delivery system body of the container pressure delivery system cooperatively defines together with the container pressure delivery system body a second channel configuration having a second inlet in operative fluid communication with the associated second fluid and disconnected from the associated first fluid and the common outlet in operative fluid communication with the container for communicating associated first fluid to the container.

In accordance with a twelfth example embodiment a work vehicle is provided according to the eleventh example, wherein the first channel configuration extends along a first run axis; the second channel configuration extends along a second run axis; the first and second run axes are substantially parallel; and the container pressure delivery system valve member is selectively pivotable between the first and second positions relative to the container pressure delivery system body about a pivot axis substantially perpendicular to the first and second run axes.

In accordance with a thirteenth example embodiment a work vehicle is provided according to any of example embodiments 1-12 and further comprising a linkage system comprising a coupler member movable between first and second positions, and first and second crank members, each having opposite first and second ends. The first end of the first crank member is attached with a manifold valve member of a manifold regulator, and the second end of the first crank member is pivotally attached with the coupler member. The first end of the second crank member is attached with a container pressure delivery system valve member, and the second end of the second crank member is pivotally attached with the coupler member. Wherein the coupler member being moved from the second position to the first position pivots the manifold valve member of the manifold regulator via the first crank member to its first position relative to a manifold body for distributing an associated commodity into an associated first fluid flowing in a first run structure of a plurality of delivery runs, and pivots the container pressure delivery system valve member via the second crank member to its first position relative to a container pressure delivery system body for communicating an associated first fluid to a container. Wherein the coupler member being moved from the first position to the second position pivots the manifold valve member of the manifold regulator via the first crank member to its second position relative to the manifold body for distributing the associated commodity into an associated second fluid flowing in a second run structure of the plurality of delivery runs, and pivots the container pressure delivery system valve member via the second crank member to its second position relative to the container pressure delivery system body for communicating the associated second fluid to the container. Wherein the coupler member is movable between the first and second positions along a nonlinear path.

In accordance with a fourteenth example embodiment a work vehicle is provided according to any of examples 1-7, wherein the container pressure delivery system comprises a container pressure regulator comprising: a container pressure delivery system body; and a container pressure delivery system valve member that is selectively translatable between first and second positions relative to the container pressure delivery system body, wherein the container pressure delivery system valve member selectively translated to the first position relative to the container pressure delivery system body of the container pressure delivery system cooperatively defines together with the container pressure delivery system body a first channel configuration having a first inlet in operative fluid communication with the associated first fluid and disconnected from the associated second fluid and a common outlet in operative fluid communication with the container for communicating associated first fluid to the container and, wherein the container pressure delivery system valve member selectively translated to the second position relative to the container pressure delivery system body of the container pressure delivery system cooperatively defines together with the container pressure delivery system body a second channel configuration having a second inlet in operative fluid communication with the associated second fluid and disconnected from the associated first fluid and the common outlet in operative fluid communication with the container for communicating associated first fluid to the container.

In accordance with a fifteenth example embodiment a work vehicle is provided according to the fourteenth example, wherein the first channel configuration extends along a first run axis; the second channel configuration extends along a second run axis; the first and second run axes are substantially parallel; and the container pressure delivery system valve member is selectively linearly translatable between the first and second positions relative to the container pressure delivery system body along a linear path substantially perpendicular to the first and second run axes.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

The invention claimed is:

1. A work vehicle comprising:
a container configured to store an associated commodity;
a commodity delivery system operatively coupled with the container, the commodity delivery system being configured to receive the associated commodity from the container and distribute the associated commodity between a plurality of delivery runs, the commodity delivery system comprising:
a first run structure defining a first run passage configured to receive an associated first fluid flowing from an associated first source at a first pressure;
a second run structure defining a second run passage configured to receive an associated second fluid flowing from an associated second source at a second pressure; and
a manifold regulator operatively coupled with the first and second run structures, the manifold regulator defining a manifold body and a manifold valve member that is movable between first and second positions relative to the manifold body, the manifold valve member selectively in the first position relative to the manifold body configured to distribute the associated commodity into the associated first fluid flowing in the first run structure of the plurality of delivery runs, and the manifold valve member selectively in the second position relative to the manifold body configured to distribute the associated commodity into the associated second fluid flowing in the second run structure of the plurality of delivery runs;
a container pressure delivery system selectively fluid coupling the container with:
the associated first fluid at the first pressure, or
the associated second fluid at the second pressure; and
a control system operably coupling the container pressure delivery system with the commodity delivery system, the control system being operable to control coordination of:
the manifold valve member selectively moved to the first position relative to the manifold body with the container pressure delivery system selectively fluid coupling the container with the associated first fluid at the first pressure to pressurize the container using the first pressure, and
the manifold valve member selectively moved to the second position relative to the manifold body with the container pressure delivery system selectively fluid coupling the container with the associated second fluid at the second pressure to pressurize the container using the second pressure.

2. The work vehicle according to claim 1, wherein:
the container pressure delivery system comprises a container pressure regulator comprising:
a container pressure delivery system body; and
a container pressure delivery system valve member that is selectively movable between first and second positions relative to the container pressure delivery system body,
the container pressure delivery system valve member in the first position relative to the container pressure delivery system body coupling the container with the associated first fluid at the first pressure to pressurize the container to the first pressure, and the container pressure delivery system valve member in the second position relative to the container pressure delivery system body coupling the container with the associated second fluid at the second pressure to pressurize the container to the second pressure.

3. The work vehicle according to claim 2, wherein the control system comprises:
an electric control system responsive to an associated selection signal to control the coordination of the manifold valve member with the container pressure delivery system, the electric control system comprising:
a linkage system mechanically coupling the container pressure delivery system valve member of the container pressure delivery system with the manifold valve member of the commodity delivery system; and
at least one system motor operable to drive the linkage system to effect relative movement:
between the container pressure delivery system valve member and the container pressure delivery system body; and
between the manifold valve member and the manifold body.

4. The work vehicle according to claim 2, wherein the control system comprises:
an electric control system responsive to an associated selection signal to control the coordination of the manifold valve member with the container pressure delivery system, the electric control system comprising:
a manifold regulator position sensor operably coupled with the manifold regulator of the commodity delivery system, the manifold regulator position sensor selectively generating a first signal responsive to the manifold valve member being in the first position relative to the manifold body, and the manifold regulator position sensor selectively generating a second signal responsive to the manifold valve member being in the second position relative to the manifold body; and
a container pressure delivery system motor operable to effect relative movement between the container pressure delivery system valve member and the container pressure delivery system body, the container pressure delivery system motor selectively moving the container pressure delivery system valve member to the first position relative to the container pressure delivery system body responsive to the first signal selectively generated by the manifold regulator position sensor for coupling the container with the associated first fluid at the first pressure, and the container pressure delivery system motor selectively moving the container pressure delivery system valve member to the second position relative to the container pressure delivery system body responsive to the second signal selectively generated by the manifold regulator position sensor for coupling the container with the associated second fluid at the first pressure.

5. The work vehicle according to claim 2, wherein the control system comprises:
an electric control system responsive to an associated selection signal to control the coordination of the manifold valve member with the container pressure delivery system, the electric control system comprising:
a command control signal generator selectively generating first or second command control signals responsive to a selection input signal;
a manifold motor operable to effect relative movement between the manifold valve member and the manifold body, the manifold motor selectively moving the manifold valve member to the first position relative to the manifold body responsive to the first command control signal selectively generated by the command control signal generator for distributing the associated commodity into the associated first fluid flowing in the first run structure of the plurality of delivery runs, and manifold motor selectively moving the manifold valve member to the second position relative to the manifold body responsive to the second command control signal selectively generated by the command control signal generator for distributing the associated commodity into the associated second fluid flowing in the second run structure of the plurality of delivery runs; and
a container pressure delivery system motor operable to effect relative movement between the container pressure delivery system valve member and the container pressure delivery system body, the container pressure delivery system motor selectively moving the container pressure delivery system valve member to the first position relative to the container pressure delivery system body responsive to the first command control signal selectively generated by the command control signal generator for coupling the container with the associated first fluid at the first pressure, and the container pressure delivery system motor selectively moving the container pressure delivery system valve member to the second position relative to the container pressure delivery system body responsive to the second command control signal selectively generated by the command control signal generator for coupling the container with the associated second fluid at the second pressure.

6. The work vehicle according to claim 1, wherein the container pressure delivery system comprises a flow restricting device selectively restricting:
a first flow of the associated first fluid at the first pressure delivered to the container, or
a second flow of the associated second fluid at the second pressure delivered to the container.

7. The work vehicle according to claim 1, wherein:
the container pressure delivery system comprises:
a container pressure delivery system body; and
a container pressure delivery system valve member that is selectively movable between first and second positions relative to the container pressure delivery system body,
wherein the container pressure delivery system valve member in the first position relative to the container pressure delivery system body couples the container with the associated first fluid at the first pressure to pressurize the container to the first pressure,
wherein the container pressure delivery system valve member in the second position relative to the container pressure delivery system body couples the container with the associated second fluid at the second pressure to pressurize the container to the second pressure,
wherein the container pressure delivery system valve member disposed between the first and second positions relative to the container pressure delivery system body selectively:
partially restricts a first flow of the associated first fluid at the first pressure delivered to the container, and completely restricts a second flow of the associated second fluid at the second pressure to block the second flow of the associated second fluid from flowing to the container, or
partially restricts the second flow of the associated second fluid at the second pressure delivered to the container, and completely restricts the first flow of the associated first fluid at the first pressure to block the first flow of the associated second fluid from flowing to the container.

8. The work vehicle according to claim 1, wherein:
the container pressure delivery system comprises a container pressure regulator comprising:
a container pressure delivery system body; and
a container pressure delivery system valve member that is selectively rotatable between first and second positions relative to the container pressure delivery system body,
the container pressure delivery system valve member selectively rotated to the first position relative to the container pressure delivery system body of the container pressure delivery system cooperatively defines together with the container pressure delivery system body a first channel configuration having:
a first inlet in operative fluid communication with the associated first fluid and disconnected from the associated second fluid; and
a common outlet in operative fluid communication with the container for communicating associated first fluid to the container and,
the container pressure delivery system valve member selectively rotated to the second position relative to the container pressure delivery system body of the container pressure delivery system cooperatively defines together with the container pressure delivery system body a second channel configuration having:
a second inlet in operative fluid communication with the associated second fluid and disconnected from the associated first fluid; and
the common outlet in operative fluid communication with the container for communicating associated second fluid to the container.

9. The work vehicle according to claim 8, wherein:
the first channel configuration extends along a first run axis;
the second channel configuration extends along a second run axis;
the first and second run axes are substantially parallel; and
the container pressure delivery system valve member is selectively rotatable between the first and second positions relative to the container pressure delivery system body about a rotation axis substantially parallel with the first and second run axes.

10. The work vehicle according to claim 8, wherein:
the common outlet of the first and second channel configurations extends along a first run axis;
the first inlet of the first channel configuration extends along a first inlet run axis perpendicular to the first run axis;
the second inlet of the second channel configuration extends along a second inlet run axis perpendicular to the first run axis and co-planar with the first inlet run axis; and
the container pressure delivery system valve member is selectively rotatable between the first and second positions relative to the container pressure delivery system body about a rotation axis substantially parallel with the first run axis and perpendicular to the first and second inlet run axes.

11. The work vehicle according to claim 1, wherein:
the container pressure delivery system comprises a container pressure regulator comprising:
a container pressure delivery system body; and
a container pressure delivery system valve member that is selectively pivotable between first and second positions relative to the container pressure delivery system body,
the container pressure delivery system valve member selectively pivoted to the first position relative to the container pressure delivery system body of the container pressure delivery system cooperatively defines together with the container pressure delivery system body a first channel configuration having:
a first inlet in operative fluid communication with the associated first fluid and disconnected from the associated second fluid; and
a common outlet in operative fluid communication with the container for communicating the associated first fluid to the container, and
the container pressure delivery system valve member selectively pivoted to the second position relative to the container pressure delivery system body of the container pressure delivery system cooperatively defines together with the container pressure delivery system body a second channel configuration having:
a second inlet in operative fluid communication with the associated second fluid and disconnected from the associated first fluid; and
the common outlet in operative fluid communication with the container for communicating the associated second fluid to the container.

12. The work vehicle according to claim 11, wherein:
the first channel configuration extends along a first run axis;
the second channel configuration extends along a second run axis;
the first and second run axes are substantially parallel; and
the container pressure delivery system valve member is selectively pivotable between the first and second positions relative to the container pressure delivery system body about a container pressure delivery system valve member pivot axis substantially perpendicular to the first and second run axes.

13. The work vehicle according to claim 11, further comprising:
a linkage system comprising:
a coupler member movable between first and second positions;
a first crank member having opposite first and second ends, the first end of the first crank member being attached with the manifold valve member of the manifold regulator, and the second end of the first crank member being pivotally attached with the coupler member; and
a second crank member having opposite first and second ends, the first end of the second crank member being attached with the container pressure delivery system valve member, and the second end of the second crank member being pivotally attached with the coupler member,
wherein the coupler member moved from the second position to the first position:
pivots the manifold valve member of the manifold regulator via the first crank member to its first position relative to the manifold body for distributing the associated commodity into the associated first fluid flowing in the first run structure of the plurality of delivery runs; and
pivots the container pressure delivery system valve member via the second crank member to its first position relative to the container pressure delivery system body for communicating the associated first fluid to the container, wherein the coupler member moved from the first position to the second position:

pivots the manifold valve member of the manifold regulator via the first crank member to its second position relative to the manifold body for distributing the associated commodity into the associated second fluid flowing in the second run structure of the plurality of delivery runs; and pivots the container pressure delivery system valve member via the second crank member to its second position relative to the container pressure delivery system body for communicating the associated second fluid to the container, wherein the coupler member is movable between the first and second positions along a nonlinear path.

14. The work vehicle according to claim 1, wherein:
the container pressure delivery system comprises a container pressure regulator comprising:
a container pressure delivery system body; and
a container pressure delivery system valve member that is selectively translatable between first and second positions relative to the container pressure delivery system body, the container pressure delivery system valve member selectively translated to the first position relative to the container pressure delivery system body of the container pressure delivery system cooperatively defines together with the container pressure delivery system body a first channel configuration having:
a first inlet in operative fluid communication with the associated first fluid and disconnected from the associated second fluid; and
a common outlet in operative fluid communication with the container for communicating associated first fluid to the container and, the container pressure delivery system valve member selectively translated to the second position relative to the container pressure delivery system body of the container pressure delivery system cooperatively defines together with the container pressure delivery system body a second channel configuration having:
a second inlet in operative fluid communication with the associated second fluid and disconnected from the associated first fluid; and
the common outlet in operative fluid communication with the container for communicating associated second fluid to the container.

15. The work vehicle according to claim 14, wherein:
the first channel configuration extends along a first run axis;
the second channel configuration extends along a second run axis;
the first and second run axes are substantially parallel; and
the container pressure delivery system valve member is selectively linearly translatable between the first and second positions relative to the container pressure delivery system body along a linear path substantially perpendicular to the first and second run axes.

16. The work vehicle according to claim 1, wherein:
the control system comprises an electric control system responsive to an associated electric selection signal to control the coordination of:
the manifold valve member selectively moved to the first position relative to the manifold body with the container pressure delivery system selectively fluid coupling the container with the associated first fluid at the first pressure to pressurize the container using the first pressure, and the manifold valve member selectively moved to the second position relative to the manifold body with the container pressure delivery system selectively fluid coupling the container with the associated second fluid at the second pressure to pressurize the container using the second pressure.

17. The work vehicle according to claim 16, wherein:
the container pressure delivery system comprises:
a container pressure delivery system body; and
a container pressure delivery system valve member that is selectively movable between first and second positions relative to the container pressure delivery system body, wherein the container pressure delivery system valve member in the first position relative to the container pressure delivery system body couples the container with the associated first fluid at the first pressure to pressurize the container to the first pressure, wherein the container pressure delivery system valve member in the second position relative to the container pressure delivery system body couples the container with the associated second fluid at the second pressure to pressurize the container to the second pressure, wherein the container pressure delivery system valve member disposed between the first and second positions relative to the container pressure delivery system body selectively:
partially restricts a first flow of the associated first fluid at the first pressure delivered to the container, and completely restricts a second flow of the associated second fluid at the second pressure to block the second flow of the associated second fluid from flowing to the container, or
partially restricts the second flow of the associated second fluid at the second pressure delivered to the container, and completely restricts the first flow of the associated first fluid at the first pressure to block the first flow of the associated second fluid from flowing to the container.

18. The work vehicle according to claim 16, wherein:
the container pressure delivery system comprises a container pressure regulator comprising:
a container pressure delivery system body; and
a container pressure delivery system valve member that is selectively rotatable between first and second positions relative to the container pressure delivery system body, the container pressure delivery system valve member selectively rotated to the first position relative to the container pressure delivery system body of the container pressure delivery system cooperatively defines together with the container pressure delivery system body a first channel configuration having:
a first inlet in operative fluid communication with the associated first fluid and disconnected from the associated second fluid; and
a common outlet in operative fluid communication with the container for communicating associated first fluid to the container and, the container pressure delivery system valve member selectively rotated to the second position relative to the container pressure delivery system body of the container pressure delivery system cooperatively defines together with the container pressure delivery system body a second channel configuration having:
- a second inlet in operative fluid communication with the associated second fluid and disconnected from the associated first fluid; and
- the common outlet in operative fluid communication with the container for communicating associated second fluid to the container.

19. The work vehicle according to claim 16, wherein:

the container pressure delivery system comprises a container pressure regulator comprising:
- a container pressure delivery system body; and
- a container pressure delivery system valve member that is selectively pivotable between first and second positions relative to the container pressure delivery system body, the container pressure delivery system valve member selectively pivoted to the first position relative to the container pressure delivery system body of the container pressure delivery system cooperatively defines together with the container pressure delivery system body a first channel configuration having:
- a first inlet in operative fluid communication with the associated first fluid and disconnected from the associated second fluid; and
- a common outlet in operative fluid communication with the container for communicating the associated first fluid to the container, and the container pressure delivery system valve member selectively pivoted to the second position relative to the container pressure delivery system body of the container pressure delivery system cooperatively defines together with the container pressure delivery system body a second channel configuration having:
- a second inlet in operative fluid communication with the associated second fluid and disconnected from the associated first fluid; and
- the common outlet in operative fluid communication with the container for communicating the associated second fluid to the container.

20. The work vehicle according to claim 1, wherein:

the container pressure delivery system comprises a container pressure regulator comprising:
- a container pressure delivery system body; and
- a container pressure delivery system valve member that is selectively translatable between first and second positions relative to the container pressure delivery system body, the container pressure delivery system valve member selectively translated to the first position relative to the container pressure delivery system body of the container pressure delivery system cooperatively defines together with the container pressure delivery system body a first channel configuration having:
- a first inlet in operative fluid communication with the associated first fluid and disconnected from the associated second fluid; and
- a common outlet in operative fluid communication with the container for communicating associated first fluid to the container and, the container pressure delivery system valve member selectively translated to the second position relative to the container pressure delivery system body of the container pressure delivery system cooperatively defines together with the container pressure delivery system body a second channel configuration having:
- a second inlet in operative fluid communication with the associated second fluid and disconnected from the associated first fluid; and
- the common outlet in operative fluid communication with the container for communicating associated second fluid to the container.

* * * * *